United States Patent
Kato et al.

(10) Patent No.: US 7,127,268 B2
(45) Date of Patent: Oct. 24, 2006

(54) RADIO TRANSMISSION APPARATUS AND RADIO TRANSMISSION METHOD

(75) Inventors: Takayuki Kato, Tokyo (JP); Hiroshi Yoshida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 407 days.

(21) Appl. No.: 10/175,783

(22) Filed: Jun. 21, 2002

(65) Prior Publication Data

US 2003/0003886 A1    Jan. 2, 2003

(30) Foreign Application Priority Data

Jun. 21, 2001 (JP) .............................. 2001-187495

(51) Int. Cl.
*H04B 1/38*    (2006.01)
(52) U.S. Cl. .................... 455/552.1; 455/118; 455/76; 455/102
(58) Field of Classification Search ............ 455/552.1, 455/553.1, 126, 127.1, 76, 69, 83, 324, 313, 455/334, 323, 103, 102, 118, 119
See application file for complete search history.

(56) References Cited

U.S. PATENT DOCUMENTS

| | | | | |
|---|---|---|---|---|
| 5,535,432 | A * | 7/1996 | Dent ........................... | 455/126 |
| 5,752,169 | A * | 5/1998 | Hareyama et al. ............. | 455/76 |
| 5,794,131 | A * | 8/1998 | Cairns ......................... | 455/76 |
| 5,794,159 | A * | 8/1998 | Portin ...................... | 455/553.1 |
| 5,940,756 | A * | 8/1999 | Sibecas et al. ........... | 455/553.1 |
| 6,125,266 | A * | 9/2000 | Matero et al. ............... | 455/126 |
| 6,175,746 | B1 * | 1/2001 | Nakayama et al. ....... | 455/552.1 |
| 6,256,511 | B1 * | 7/2001 | Brown et al. ............. | 455/552.1 |
| 6,370,203 | B1 * | 4/2002 | Boesch et al. ................ | 455/69 |
| 6,384,677 | B1 * | 5/2002 | Yamamoto .................. | 455/118 |
| 6,484,038 | B1 * | 11/2002 | Gore et al. .............. | 455/552.1 |
| 6,584,090 | B1 * | 6/2003 | Abdelgany et al. ...... | 455/552.1 |
| 6,671,500 | B1 * | 12/2003 | Damgaard et al. .......... | 455/118 |
| 6,690,949 | B1 * | 2/2004 | Shamlou et al. ......... | 455/552.1 |
| 6,708,044 | B1 * | 3/2004 | Puknat et al. ............. | 455/552.1 |
| 6,714,765 | B1 * | 3/2004 | Kimppa ...................... | 455/76 |
| 6,728,517 | B1 * | 4/2004 | Sugar et al. ............. | 455/552.1 |
| 6,771,667 | B1 * | 8/2004 | Paneth et al. ............. | 455/313 |
| 6,816,712 | B1 * | 11/2004 | Otaka et al. .................. | 455/83 |
| 6,819,941 | B1 * | 11/2004 | Dening et al. ........... | 455/127.1 |
| 6,871,055 | B1 * | 3/2005 | Hirano et al. ............... | 455/324 |

(Continued)

FOREIGN PATENT DOCUMENTS

EP    0 996 301    4/2000

(Continued)

*Primary Examiner*—Lana Le
(74) *Attorney, Agent, or Firm*—Oblon, Spivak, McClelland, Maier & Neustadt, P.C.

(57) ABSTRACT

According to the present invention, there is disclosed a radio transmitter comprising: a signal processing section which outputs a control signal for designating one of first and second communication systems and a base band signal; a frequency synthesizer for outputting an LO signal corresponding to the control signal; a quadrature modulator into which the base band signal and LO signal are inputted; a first terminal for the first communication system; a second terminal for the second communication system; a first radio section which is disposed between the quadrature modulator and the first terminal and corresponds to the first communication system; a second radio section which is disposed between the quadrature modulator and the second terminal and corresponds to the second communication system; and a switch which passes an output signal from the quadrature modulator through any one of the first and second radio sections in response to the control signal.

18 Claims, 8 Drawing Sheets

U.S. PATENT DOCUMENTS

2002/0177465 A1* 11/2002 Robinett .................. 455/553.1
2004/0048584 A1* 3/2004 Vaidyanathan et al. ..... 455/103
2005/0164733 A1* 7/2005 Sato ........................ 455/553.1

FOREIGN PATENT DOCUMENTS

| | | |
|---|---|---|
| JP | 5-65139 | 8/1993 |
| JP | 9-252324 | 9/1997 |
| JP | 2000-124829 | 4/2000 |
| JP | 3490097 | 1/2004 |

* cited by examiner

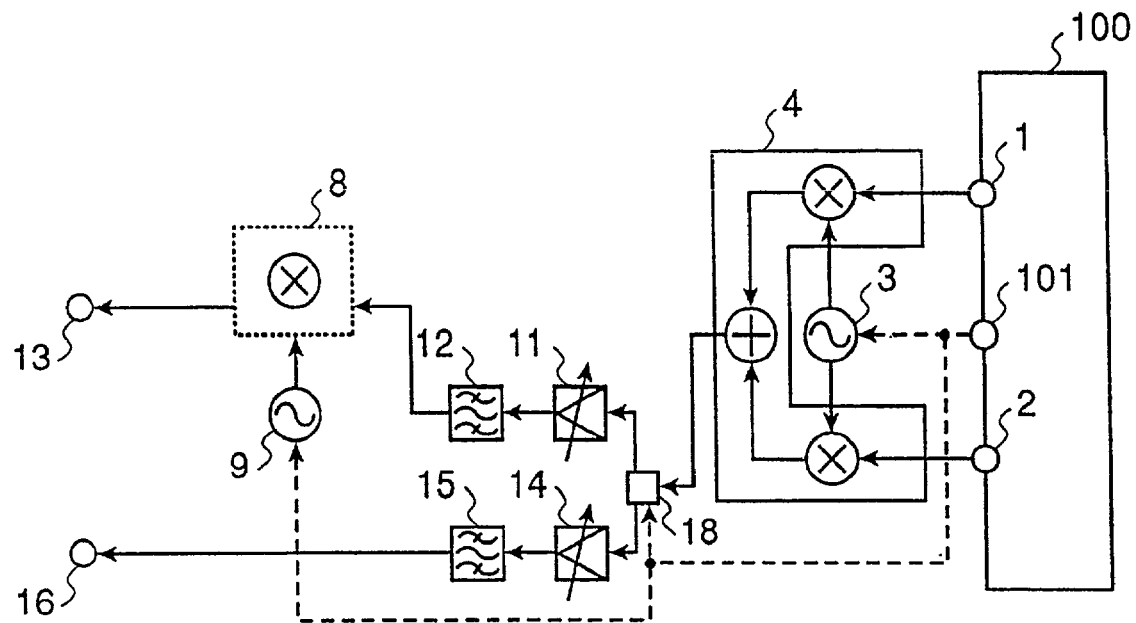
F I G. 1
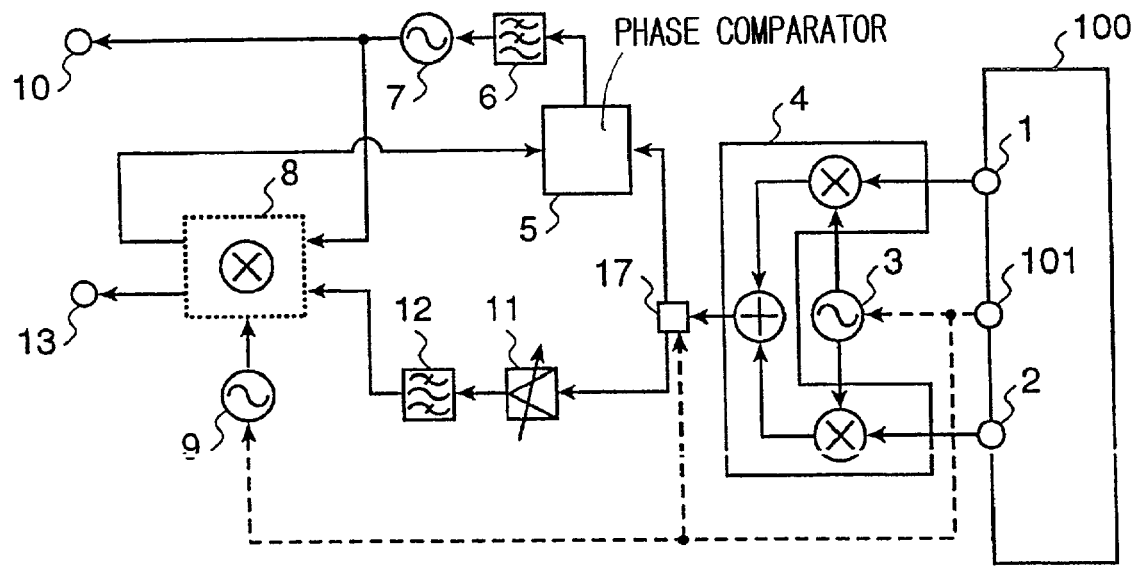
F I G. 2

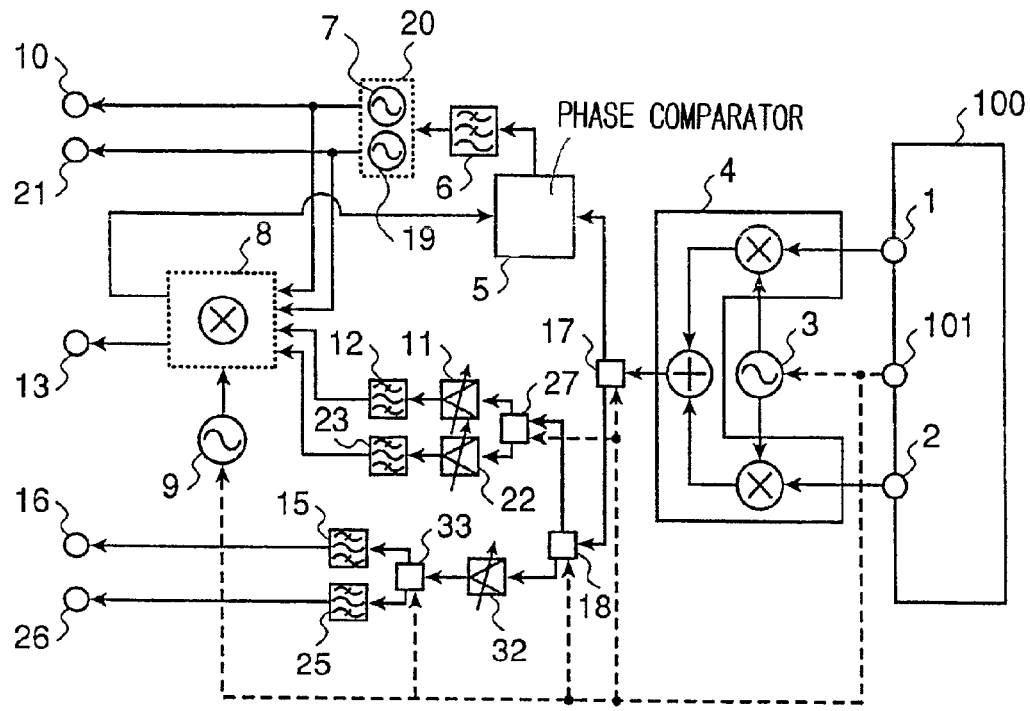
F I G. 9
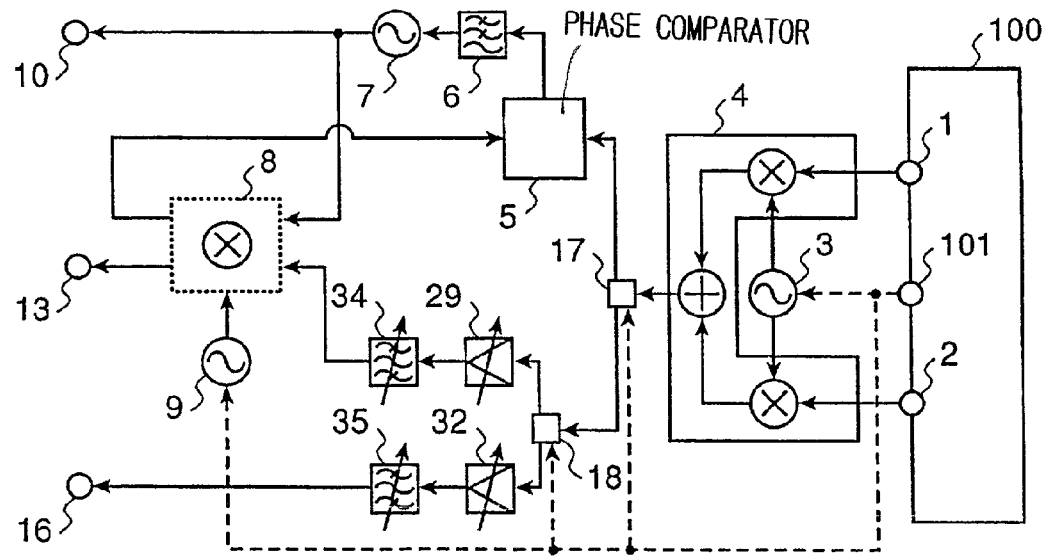
F I G. 10

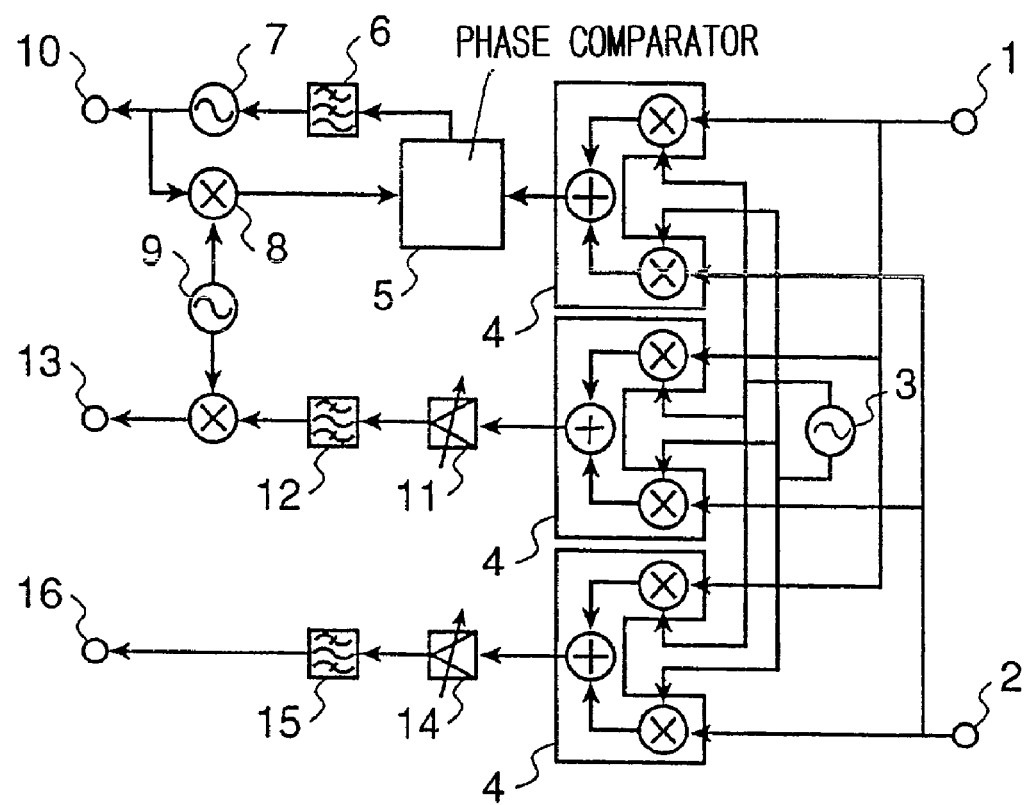
F I G. 16

RADIO TRANSMISSION APPARATUS AND RADIO TRANSMISSION METHOD

BACKGROUND OF THE INVENTION

1. Field of the Invention

The present invention relates to a radio transmission apparatus and radio transmission method for use in a radio communication system, particularly to a multimode radio transmitter which can be used in a plurality of radio communication systems.

2. Related Background Art

A radio apparatus for use in a radio communication system is divided into a transmission apparatus (hereinafter referred to as a transmitter) used for the radio apparatus to transmit a signal, and a reception apparatus (hereinafter referred to as a receiver) used for receiving the signal sent from another radio apparatus.

There are various types of configurations of the transmitter and receiver, and the most suitable configuration to satisfy system requirement of the radio communication system at which the radio apparatus aims is employed as the configurations of the transmitter. Three types of configurations frequently used as a transmitter configuration will briefly be described hereinafter.

(First Transmitter Configuration: Translation Loop)

FIG. 13 shows a transmitter configuration called "Translation Loop". The configuration also has other names such as "Modulation Loop", but here the name "Translation Loop" will be used.

In the "Translation Loop", since a phase lock loop (PLL) is composed of a phase comparator 5, loop filter 6, first voltage control oscillator 7, frequency converter 8, and second synthesizer 9, an RF oscillator signal outputted from the first voltage control oscillator 7 is a signal having remarkably little noise.

However, the configuration of the "Translation Loop" can be used only in the radio communication system using frequency modulation such as a Gaussian-filtered minimum shift keying (GMSK) modulation.

An operation of the "Translation Loop" will briefly be described hereinafter taking the radio communication system (hereinafter referred to as GSM900) called global system for mobile communication (GSM) using a 900 MHz band as an example.

First, GMSK-modulated base band signals inputted via I and Q channel base band signal input terminals 1, 2 are multiplied with a first local oscillator (LO) signal outputted from a first synthesizer 3 in a quadrature modulator 4, and frequency-converted to an intermediate frequency (IF) signal. Additionally, a 90° phase shifter is omitted (this also applies to all the drawings hereinafter).

Subsequently, the IF signal outputted from the quadrature modulator 4 is inputted into a phase comparator 5.

On the other hand, the first voltage control oscillator 7 outputs a radio frequency (RF) oscillator signal corresponding to a voltage given from a loop filter. The RF oscillator signal outputted from the first voltage control oscillator 7 is inputted into the frequency converter 8. The frequency converter 8 multiplies the RF oscillator signal outputted from the first voltage control oscillator 7 with a second LO signal outputted from the second synthesizer 9, and ideally the frequency of the IF signal outputted form the first voltage control oscillator 7 and the frequency of the IF signal outputted from quadrature modulator is the same. The IF signal outputted from the frequency converter 8 is inputted into the phase comparator 5. The phase comparator 5 compares the phase of the IF signal inputted from the quadrature modulator 4 with that of the IF signal inputted from the frequency converter 8, and outputs a voltage corresponding to a phase difference of the two signals to the loop filter 6. The loop filter 6 attenuates unnecessary high-frequency signals except direct current and low-frequency signals which are generated in accordance with the phase difference of the two IF signals. The first voltage control oscillator 7 outputs the RF oscillator signal corresponding to the voltage outputted from the loop filter 6.

The RF oscillator signal outputted from the first voltage control oscillator 7 is outputted from the first signal output connector for "Translation Loop" 10.

(Second Transmitter Configuration; Super-Heterodyne)

FIG. 14 shows a transmitter configuration called a "Super-Heterodyne". An operation of the "Super-Heterodyne" will briefly be described hereinafter taking the radio communication system called wide-band code division multiple access (W-CDMA) as an example.

First, the hybrid phase shift keying (HPSK) modulated base band signals are inputted via the I and Q channel base band signal input terminals 1, 2 and multiplied with the first LO signal outputted from the first synthesizer 3 in the quadrature modulator 4, and the IF signals are outputted from the quadrature modulator.

Subsequently, the IF signal outputted from the quadrature modulator 4 is inputted into a first IF variable gain amplifier 11 and the IF signal power is amplified. Next, the IF signals outputted from the first IF variable gain amplifier 11 are inputted into a first IF band pass filter 12, and unnecessary signals in the IF signals are attenuated. The IF signal is inputted into the frequency converter 8. The frequency converter 8 multiplies the IF signal outputted from the first IF band pass filter 12 with the second LO signal outputted from the second synthesizer 9, and outputs the RF signal. The RF signal outputted from the frequency converter 8 is outputted from a signal output terminal 13 for the "Super-Heterodyne".

The "Super-Heterodyne" can be used regardless of a modulation, and is broadly used in various radio communication systems. Moreover, as the gain dynamic range of the IF variable gain amplifier can be large, the "Super-Heterodyne" is particularly used in the radio communication systems which need a large transmission power control range.

(Third Transmitter Configuration; Direct-Conversion)

FIG. 15 shows a transmitter configuration called "Direct-Conversion". An operation of the "Direct-Conversion" will be described hereinafter taking the radio communication system called personal digital cellular (PDC) using a frequency of a 800 MHz band as an example.

In this configuration, first, the base band signals inputted via the I and Q channel base band signal input terminals 1, 2 and multiplied with the first LO signal outputted from the first synthesizer 3 in the quadrature modulator 4, in order to frequency-convert to the RF signals.

Subsequently, the RF signal outputted from the quadrature modulator 4 is inputted into a first RF variable gain amplifier 14 to amplify power. Next, the RF signals which are outputted from the first variable gain amplifier for RF 14 and from which the unnecessary signals are removed by a first band pass filter for RF 15 are outputted. The RF signal outputted from the first band pass filter for RF 15 is outputted from a signal output terminal for "Direct-Conversion" 16.

Similarly as the "Super-Heterodyne", the "Direct-Conversion" can be used regardless of the modulation, and is therefore used for the radio communication systems using various modulation. Moreover, since the amplifier and filter for the IF stage is unnecessary, a transmitter can be miniaturized as compared with "Super-Heterodyne". Therefore, the "Direct-Conversion" is often used, when the radio apparatus is to be miniaturized.

As described above, for many of the conventional radio apparatuses, the above-described transmitter configurations have been designed exclusively for the respective radio communication systems, and an exclusive-use radio apparatus has been constituted for each radio communication system.

(Multimode Radio Apparatus)

In recent years, cellular phone users have increased all over the world, and various radio communication systems have been used. Therefore, there has been an increasing demand for a so-called "multimode radio apparatus" such that one radio apparatus can be used in a plurality of radio communication systems.

For example, when a transmission section of the "multimode radio apparatus" is realized by a conventional method of constituting the transmitter exclusive for each radio communication system and, for example, when the multimode radio apparatus can be used in three radio communication systems GSM/W-CDMA/PDC, as shown in FIG. 16, the same number of transmitters exclusive for the respective radio communication systems as the number of radio communication systems are arranged, and the transmitters are large-scaled. Additionally, each of the first and second synthesizers 3 and 9 includes the same number of voltage control oscillators as the number of the corresponding radio communication systems.

On the other hand, there has been a demand for a convenient, small-sized and light-weight radio apparatus superior in portability.

SUMMARY OF THE INVENTION

An object of the present invention is to provide a small-sized and light-weight multimode radio transmission apparatus and radio transmission method having a transmission function of a multimode radio apparatus used for a plurality of radio communication system.

A radio transmission apparatus according to an embodiment of the present invention comprising:

a digital signal processing section which outputs a base band signal for a first or second radio communication system;

a frequency synthesizer which outputs a local oscillator signal for said first or second radio communication system;

a quadrature modulator which generates a modulated signal based on said base band signal and said local oscillator signal;

a first output terminal which outputs a transmission signal for said first radio communication system;

a second output terminal which outputs a transmission signal for said second radio communication system;

a first transmission processing section which is disposed between said quadrature modulator and said first output terminal and corresponds to said first radio communication system;

a second transmission processing section which is disposed between said quadrature modulator and said second output terminal and corresponds to said second radio communication system; and a first switch section which changes whether or not to supply an output signal of said quadrature modulator to said first or second transmission processing section.

According to the radio transmission apparatus of the present invention, it is possible to realize the transmission apparatus having excellent features such as compact, light weight and low power consumption, as compared with the transmitter for multimode radio apparatus realized by the conventional configurations.

A radio transmitter comprising:

a digital signal processing section which can output a base band signal for a first or second radio communication system;

a first frequency synthesizer which can output a first local oscillator signal for said first radio communication system, or a second local oscillator signal for said second radio communication system;

a quadrature modulator which can generate a quadrature modulation signal based on said base band signal and said first local oscillator signal, or a quadrature modulation signal based on said base band signal and said second local oscillator signal;

a first output terminal which outputs a transmission signal for said first radio communication system;

a second output terminal which outputs a transmission signal for said second radio communication system;

a first transmission processing section which is disposed between said quadrature modulator and said first output terminal and converts a frequency of a signal relating to said quadrature modulation signal for said first radio communication system in a frequency converter;

a second transmission processing section which is disposed between said quadrature modulator and said second output terminal and converts a frequency of said quadrature modulation signal for said second radio communication system in said frequency converter;

a second frequency synthesizer which supplies a third local oscillator signal for said first radio communication system or a fourth local oscillator signal for said second radio communication system to said frequency converter; and a first switch section which changes whether or not to supply an output signal of said quadrature modulator to said first or second transmission processing section.

A radio transmitter comprising:

a digital signal processing section which can output a base band signal for a first, second or third radio communication system;

a first frequency synthesizer which can output a first local oscillator signal for said first radio communication system, a second local oscillator signal for said second radio communication system or a third local oscillator signal for said third radio communication system;

a quadrature modulator which can generate a quadrature modulation signal based on said base band signal and said first local oscillator signal, a quadrature modulation signal based on said base band signal and said second local oscillator signal, or a quadrature modulation signal based on said base band signal and said third local oscillator signal;

a first output terminal which outputs a transmission signal for said first radio communication system;

a second output terminal which outputs a transmission signal for said second radio communication system;

a third output terminal which outputs a transmission signal for said third radio communication system;

a first transmission processing section which is disposed between said quadrature modulator and said first output terminal and converts a frequency of a signal relating to said quadrature modulation signal for said first radio communication system in a frequency converter;

a second transmission processing section which is disposed between said quadrature modulator and said second and third output terminals, converts a frequency of said quadrature modulation signal for said second radio communication system in said frequency converter, and processes said quadrature modulation signal for said third radio communication system;

a second frequency synthesizer which supplies the third local oscillator signal for said first radio communication system and a fourth local oscillator signal for said second radio communication system to said frequency converter; and a first switch section which changes whether or not to supply said quadrature modulation signal to said first or second transmission processing section.

BRIEF DESCRIPTION OF THE DRAWINGS

FIG. 1 is a block diagram of a transmitter composed of combining "Super-Heterodyne" and "Direct-Conversion" which can be used in two radio communication systems W-CDMA and PDC (800 MHz) using HPSK and π/4-QPSK modulation, respectively, according to a first concrete example of a first embodiment of the present invention.

FIG. 2 is a block diagram of a transmitter composed of combining "Translation Loop" and "Super-Heterodyne" which can be used in two radio communication systems GSM900 and W-CDMA using GMSK and HPSK modulation, respectively, according to a second concrete example of the first embodiment of the present invention.

FIG. 9 is a block diagram of a transmitter composed of combining "Translation Loop", "Super-Heterodyne" and "Direct-Conversion" which can be used in six radio communication systems including: GSM900 and DCS1800 using the GMSK modulation; W-CDMA using the HPSK modulation; and PHS, PDC (800 MHz band) and PDC (1500 MHz) using the π/4-QPSK modulation according to a fifth embodiment of the present invention, and the transmitter uses a variable gain amplifier for RF in the "Direct-Conversion" in common in two systems.

FIG. 10 is a block diagram of a transmitter composed of combining "Translation Loop", "Super-Heterodyne" and "Direct-Conversion" which can be used in five radio communication systems including: GSM900 using the GMSK modulation; W-CDMA using the HPSK modulation; and PDC (800 MHz band) and PDC (1500 MHz) and PHS using the π/4-QPSK modulation according to a sixth embodiment of the present invention, and the transmitter uses IF and RF band pass filters which bandwidth can be variable.

FIG. 16 is a block diagram of a transmitter for a multi-mode radio apparatus realized by a conventional transmission section constituting method.

DESCRIPTION OF THE PREFERRED EMBODIMENTS

Figure 3:
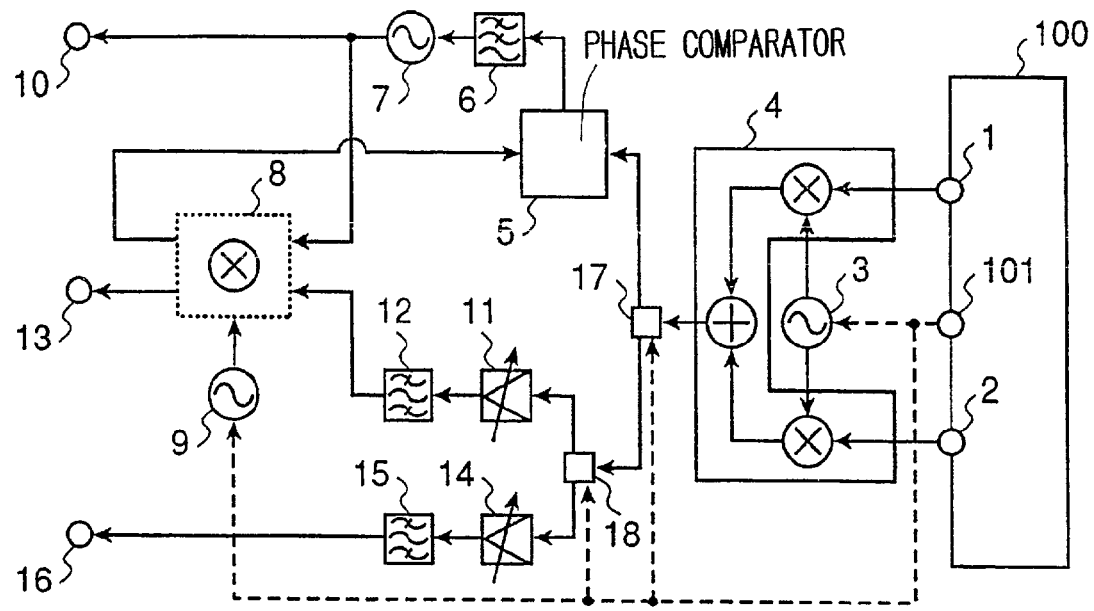
FIG. 3 is a block diagram of a transmitter composed of combining "Translation Loop", "Super-Heterodyne" and "Direct-Conversion" which can be used in three radio communication systems GSM900, W-CDMA, and PDC (800 MHz) using GMSK, HPSK, and π/4-QPSK modulation, respectively, according to a third concrete example of the first embodiment of the present invention.

Embodiments of the present invention will be described hereinafter with reference to the drawings.

(First Embodiment)

(First Concrete Example: Transmitter composed of combining "Super-Heterodyne" and "Direct-Conversion" which can be used in two radio communication systems W-CDMA and PDC (800 MHz) using HPSK and π/4-QPSK modulation, respectively)

FIG. 1 is a block diagram of a multimode radio transmitter according to a first concrete example of a first embodiment. The present transmitter is a transmitter combined with "Super-Heterodyne" and "Direct-Conversion".

In FIG. 1, reference numerals 1, 2 denote I and Q channel base band signal input terminals, 3 denotes a first frequency synthesizer (a frequency synthesizer will be hereinafter referred to simply as a synthesizer), 4 denotes a quadrature modulator, 8 denotes a frequency converter, 9 denotes a second synthesizer, 11 denotes a first variable gain amplifier for IF, 12 denotes a first band pass filter for IF, 13 denotes a "Super-Heterodyne" signal output terminal, 14 denotes a first variable gain amplifier for RF, 15 denotes a first band pass filter for RF, 16 denotes a first signal output terminal for "Direct-Conversion", 18 denotes second quadrature modulator output signal segmenting means, 100 denotes a digital signal processor, and 101 denotes a control terminal of the digital signal processor.

A control signal line (shown by a dot line) from the control terminal 101 is connected to the first and second synthesizers 3, 9 and second quadrature modulator output signal segmenting means 18. Furthermore, the "Super-Heterodyne" signal output terminal 13 is followed by a driver amplifier, filter, and power amplifier. The first signal output terminal for the "Direct-Conversion" 16 is followed by a driver amplifier, band pass filter, and power amplifier. Thereafter, an exclusive-use or common-use antenna (not shown) is disposed.

Quadrature modulators have heretofore been disposed separately for the "Super-Heterodyne" and "Direct-Conversion". In the first concrete example, however, one quadrature modulator 4 including functions of the quadrature modulators is used in common in the "Super-Heterodyne" and "Direct-Conversion".

When the first concrete example is used, the configuration can further be miniaturized and simplified, and a size and power consumption of a transmitter can be reduced as compared with the conventional configuration including the quadrature modulators for the respective radio communication systems. Additionally, a third concrete example described later is referred to for an operation of the first concrete example, and the description of the operation is omitted here.

(Second Concrete Example: Transmitter composed of combining "Translation Loop" and "Super-Heterodyne" which can be used in two radio communication systems GSM900 and W-CDMA using GMSK and HPSK modulation, respectively)

FIG. 2 is a block diagram of the multimode radio transmitter according to a second concrete example of the first embodiment. The present transmitter is a transmitter combined with "Translation Loop" and "Super-Heterodyne".

In FIG. 2, the reference numerals 1, 2 denote the I and Q channel base band signal input terminals, 3 denotes the first synthesizer, 4 denotes the quadrature modulator, 5 denotes a phase comparator, 6 denotes a loop filter, 7 denotes a first voltage control oscillator, 8 denotes the frequency converter, 9 denotes the second synthesizer, 10 denotes a first "Translation Loop" signal output terminal, 11 denotes the first variable gain amplifier for IF, 12 denotes the first band pass filter for IF, 13 denotes the "Super-Heterodyne" signal output terminal, 17 denotes first quadrature modulator output signal segmenting means, 100 denotes the digital signal processor, and 101 denotes the control terminal of the digital signal processor.

The control signal line (shown by the dot line) from the control terminal 101 is connected to the first and second synthesizers 3, 9 and first quadrature modulator output signal segmenting means 17. Furthermore, the first "Translation Loop" signal output terminal 10 is followed by the filter and power amplifier. The "Super-Heterodyne" signal output terminal 13 is followed by the driver amplifier, power amplifier, and isolator. Thereafter, the exclusive-use or common-use antenna (not shown) is disposed.

Frequency converters and quadrature modulators have heretofore been disposed separately for the "Translation Loop" and "Super-Heterodyne". In the second concrete example, however, one frequency converter 8 and quadrature modulator 4 including functions of the conventional frequency converters and quadrature modulators are used, and shared by the "Translation Loop" and "Super-Heterodyne".

When the second concrete example is used, the configuration can further be miniaturized and simplified, and the size and power consumption of the transmitter can be reduced as compared with the conventional transmitter configuration (including the quadrature modulators and frequency converters disposed for the respective radio communication systems). Additionally, the third concrete example described later is referred to for an operation of the second concrete example, and the description of the operation is omitted here.

(Third Concrete Example; Transmitter composed of combining "Translation Loop", "Super-Heterodyne", and "Direct-Conversion" which can be used in three radio communication systems GSM900, W-CDMA, and PDC (800 MHz) using the GMSK, HPSK, and π/4-QPSK modulation)

FIG. 3 is a block diagram of the multimode radio transmitter according to a third concrete example of the first embodiment of the present invention. The transmitter is a transmitter combined with "Translation Loop", "Super-Heterodyne" and "Direct-Conversion".

In FIG. 3, the reference numerals 1, 2 denote the I and Q channel base band signal input terminals, 3 denotes the first synthesizer, 4 denotes the quadrature modulator, 5 denotes the phase comparator, 6 denotes the loop filter, 7 denotes the first voltage control oscillator, 8 denotes the frequency converter, 9 denotes the second synthesizer, 10 denotes the first "Translation Loop" signal output terminal, 11 denotes the first variable gain amplifier for IF, 12 denotes the first band pass filter for IF, 13 denotes the "Super-Heterodyne" signal output terminal, 14 denotes the first variable gain amplifier for RF, 15 denotes the first band pass filter for RF, 16 denotes the first signal output terminal for the "Direct-Conversion", 17 denotes the first quadrature modulator output signal segmenting means, 18 denotes the second quadrature modulator output signal segmenting means, 100 denotes the digital signal processor, and 101 denotes the control terminal of the digital signal processor.

The control signal line (shown by the dot line) from the control terminal 101 is connected to the first and second synthesizers 3, 9 and first and second quadrature modulator output signal segmenting means 17, 18. Furthermore, the first "Translation Loop" signal output terminal 10 is followed by the filter and power amplifier. The "Super-Heterodyne" signal output terminal 13 is followed by the driver amplifier, power amplifier, and isolator. The first signal output terminal for the "Direct-Conversion" 16 is followed by the driver amplifier, band pass filter, and power amplifier. Thereafter, the exclusive-use or common-use antenna (not shown) is disposed.

The quadrature modulators have heretofore been disposed separately for the "Translation Loop", "Super-Heterodyne" and "Direct-Conversion". In the third concrete example, however, one quadrature modulator 4 including the functions of the quadrature modulators is used, and shared by the "Translation Loop", "Super-Heterodyne" and "Direct-Conversion". Moreover, the frequency converters have heretofore been disposed separately for the "Translation Loop" and "Super-Heterodyne", but in this example one frequency converter 8 having the functions of the frequency converters is used and shared by the "Translation Loop" and "Super-Heterodyne".

When the third concrete example is used, the transmitter configuration can further be miniaturized and simplified, and the size and power consumption of the transmitter can be reduced as compared with the conventional transmitter configuration.

Here, a frequency converter which correctly operates with respect to the IF to RF signals as input and output signals and has a broad input/output frequency range is used in the frequency converter 8 for use in the transmitter of the first embodiment of the present invention. Additionally, the configuration example of the frequency converter 8 will be described later.

Moreover, synthesizers in which frequencies of first and second LO signals to output can be set to required values are used in the first and second synthesizers 3 and 9.

An operation of the third concrete example will next be described briefly.

The digital signal processor 100 inputs the base band signals into the quadrature modulator 4 via the I and Q channel base band signal input terminals 1, 2.

The digital signal processor 100 grasps that the inputted base band signal is a signal of a radio communication system suitable for any one of the transmitter configurations "Translation Loop", "Super-Heterodyne" and "Direct-Conversion". Moreover, in response to a control signal (shown by a dot line) from the control terminal 101 of the digital signal processor 100, the frequencies of the LO signals of the first and second synthesizers 3 and 9 can be changed, and the segmenting of the first and second quadrature modulator output signal segmenting means 17 and 18 can be controlled, so that the operation of the present transmission section is determined.

That is, when the inputted base band signal is the signal of the radio communication system suitable for the "Translation Loop", the I and Q channel base band signal input terminals 1, 2, first synthesizer 3, quadrature modulator 4, phase comparator 5, loop filter 6, first voltage control oscillator 7, frequency converter 8, second synthesizer 9, and first "Translation Loop" signal output terminal 10 are used to perform the operation of the "Translation Loop".

Moreover, when the inputted base band signal is a signal of the radio communication system suitable for the "Super-Heterodyne", the I and Q channel base band signal input terminals 1, 2, first synthesizer 3, quadrature modulator 4, first variable gain amplifier for IF 11, first band pass filter for IF 12, frequency converter 8, second synthesizer 9, and "Super-Heterodyne" signal output terminal 13 are used to perform the operation of the "Super-Heterodyne".

Furthermore, when the inputted base band signal is a signal of the radio communication system suitable for the "Direct-Conversion", the I and Q channel base band signal input terminals 1, 2, first synthesizer 3, quadrature modulator 4, first variable gain amplifier for RF 14, first band pass filter for RF 15, and first signal output terminal for the "Direct-Conversion" 16 are used to perform the operation of the "Direct-Conversion".

To concretely describe the operation of the third concrete example hereinafter, as one example, the uses in three radio communication systems GSM900 suitable for the "Translation Loop", W-CDMA suitable for the "Super-Heterodyne", and PDC (800 MHz) suitable for the "Direct-Conversion" will be described in detail. Moreover, to describe the operation of the present transmitter in detail, a concrete frequency configuration shown in the following Table 1 is used.

TABLE 1

Concrete Frequency Configuration (1) of Radio Communication System

| Radio communication system name | Signal band width | IF signal frequency | RF output signal frequency |
|---|---|---|---|
| GSM900 | 200 kHz | 95 MHz | 880 to 915 MHz |
| W-CDMA | 3.84 MHz | 380 MHz | 1920 to 1980 MHz |
| PDC (800 MHz) | 25 kHz | — | 887 to 958 MHz |

(Use in GSM900)

The digital signal processor 100 inputs the base band signals of GSM900 of I and Q channels, deviating in phase from each other by 90 degrees, into the quadrature modulator 4 via the I and Q channel base band signal input terminals 1, 2. The base band signal of GSM900 is outputted from the first synthesizer 3 in the quadrature modulator 4. The signal is multiplied by a first LO signal with a frequency of 95 MHz, and frequency-converted to a first IF signal with a frequency of 95 MHz.

The frequency-converted first IF signal of GSM900 is inputted into the phase comparator 5 through the first quadrature modulator output signal segmenting means 17.

In this case, concretely a switch for changing over a signal path, diplexer for segmenting a pass path by the frequency, and the like can be used as the first quadrature modulator output signal segmenting means 17.

On the other hand, an RF oscillator signal outputted from the first voltage control oscillator 7, and second LO signal outputted from the second synthesizer 9 are inputted into the frequency converter 8. The first voltage control oscillator 7 outputs the RF oscillator signal having an oscillation frequency corresponding to a value of voltage supplied from the loop filter 6.

Here, for the frequencies of two signals inputted into the frequency converter 8, the frequency of the RF oscillator signal is in a range of 880 to 915 MHz, and the frequency of the second LO signal is higher or lower than that of the RF oscillator signal by 95 MHz, that is, in a range of 975 to 1010 MHz or 785 to 820 MHz.

In this case, any one of high and low frequencies may be used.

The frequency converter 8 multiplies these two signals, generates a second IF signal with a frequency of 95 MHz as a frequency difference of two signals, and outputs the signal to the phase comparator 5.

The phase comparator 5 detects a phase difference between the first IF signal outputted from the quadrature modulator 4 and the second IF signal outputted from the frequency converter 8, and outputs the voltage corresponding to the difference. When the phases of these two signals inputted into the phase comparator 5 are completely equal to each other, a voltage value outputted to the loop filter 6 from the phase comparator 5 indicates a certain constant value. The frequency of the RF oscillator signal outputted from the first voltage control oscillator 7 indicates a constant value as such. However, when there is a phase difference between two IF signals, the value of the voltage outputted to the first voltage control oscillator 7 from the phase comparator 5 changes. The frequency of the RF oscillator signal outputted from the first voltage control oscillator 7 changes so that the frequencies of two IF signals inputted into the phase comparator 5 are equal.

Moreover, the RF oscillator signal outputted from the first voltage control oscillator 7 is outputted from the first "Translation Loop" signal output terminal 10.

(Use in W-CDMA)

The digital signal processor 100 inputs the base band signals of W-CDMA of the I and Q channels, deviating in phase from each other by 90 degrees, into the quadrature modulator 4 via the I and Q channel base band signal input terminals 1, 2. The base band signal of W-CDMA is multiplied by the first LO signal with a frequency of 380 MHz outputted from the first synthesizer 3 in the quadrature modulator 4, and frequency-converted to the IF signal with a frequency of 380 MHz. Subsequently, the IF signal of W-CDMA outputted from the quadrature modulator 4 is passed through the first and second quadrature modulator output signal segmenting means 17, 18, and inputted into the first variable gain amplifier for IF 11. An amplifier which can freely adjust and amplify a gain of a signal having a band width of 3.84 MHz at a frequency of 380 MHz in a limited range is used in the first variable gain amplifier for IF 11.

In this case, similarly as the first quadrature modulator output signal segmenting means 17, concretely the switch for changing over the signal path, diplexer for segmenting the pass path by the frequency, and the like are used as the second quadrature modulator output signal segmenting means 18.

The IF signals of W-CDMA outputted from the first variable gain amplifier for IF 11 are passed through the first band pass filter for IF 12, the unnecessary signals are removed, and the IF signals are inputted into the frequency converter 8. A filter having a property of passing a signal having a band width of 3.84 MHz at a frequency of 380 MHz, and attenuating the other signals is used in the first band pass filter for IF 12.

The IF signal of W-CDMA outputted from the first band pass filter for IF 12 and the second LO signal outputted from the second synthesizer 9 are inputted into the frequency converter 8.

In this case, the frequency of the second LO signal inputted into the frequency converter 8 is higher or lower than the frequency of the RF output signal of W-CDMA in a range of 1920 to 1980 MHz by 380 MHz, that is, in a range of 2300 to 2360 MHz or 1540 to 1600 MHz. In this case, any one of the frequency ranges may be used.

Moreover, the frequency converter 8 multiplies these two signals, and outputs the RF signal of W-CDMA so that the frequency of the inputted IF signal of W-CDMA is in a range of 1920 to 1980 MHz after frequency conversion.

Furthermore, the RF signal of W-CDMA outputted from the frequency converter 8 is outputted from the "Super-Heterodyne" signal output terminal 13.

(Use in PDC (800 MHz))

The digital signal processor 100 inputs the base band signals of PDC (800 MHz) of the I and Q channels, deviating in phase from each other by 90 degrees, into the quadrature modulator 4 via the I and Q channel base band signal input terminals 1, 2. The base band signal of PDC (800 MHz) is multiplied by the first LO signal which is outputted from the first synthesizer 3 in the quadrature modulator 4 and whose frequency is equal to the RF output signal frequency of 887 to 958 MHz of PDC (800 MHz), and frequency-converted to the RF signal.

Subsequently, the RF signal of PDC (800 MHz) outputted from the quadrature modulator 4 is passed through the first and second quadrature modulator output signal segmenting means 17, 18, and inputted into the first variable gain amplifier for RF 14. An amplifier which can freely adjust and amplify the gain of the signal having a band width of 25 kHz at a frequency of 887 to 958 MHz in a limited range is used in the first variable gain amplifier for RF.

The first variable gain amplifier for RF 14 amplifies the inputted RF signal of PDC (800 MHz), and outputs the signal to the first band pass filter for RF 15. Moreover, after the unnecessary signals are removed from the RF signals of PDC (800 MHz) inputted into the first band pass filter for RF 15, the RF signals are outputted from the first signal output terminal for the "Direct-Conversion" 16. A filter having a property of passing a signal having a band width of 25 kHz at a frequency of 887 to 958 MHz, and attenuating the other signals is used in the first band pass filter for RF 15.

As described above, in the third concrete example, the quadrature modulator and frequency converter heretofore disposed separately for GSM, W-CDMA and PDC (800 MHz) are used in common, and thereby the number of elements constituting the transmission section is decreased. The transmitter can operate as the "Translation Loop", "Super-Heterodyne", or "Direct-Conversion". When this transmitter is used, a small-sized and lightweight transmitter of the "multimode radio apparatus" can be realized.

Additionally, in the description of the operation of the first embodiment according to the present invention, GSM900 is used as the radio communication system suitable for the "Translation Loop", W-CDMA is used as the radio communication system suitable for the "Super-Heterodyne", and PDC (800 MHz) is used as the radio communication system suitable for the "Direct-Conversion". However, a combination of the radio system and radio communication system may sometimes be different from the combination used in the operation description.

(Concrete Example of Frequency Converter 8)

The frequency converter 8 will be described hereinafter in order of a concept level and circuit level.

Figure 4:
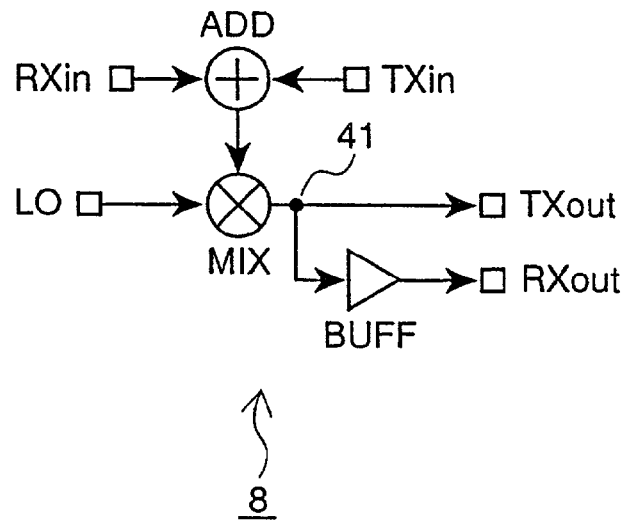
FIG. 4 is a basic concept diagram of a frequency converter 8.

FIG. 4 is a basic concept diagram of the frequency converter 8. An adder ADD adds a high-frequency input signal terminal RXin (the output signal from the first voltage control oscillator 7 of FIG. 3 is inputted into RXin) and low-frequency input signal terminal TXin (the output signal from the first band pass filter for IF 12 of FIG. 3 is inputted into TXin), and inputs the added signal into a frequency converter MIX. On the other hand, a local signal LO (corresponding to the signal outputted from the second synthesizer 9 of FIG. 3) is inputted into a local input section of the frequency converter MIX. A result of the frequency conversion of the input signal is outputted to an output terminal 41 of the frequency converter MIX. The output terminal 41 is connected to a high-frequency output terminal TXout (TXout is connected to the "Super-Heterodyne" signal output terminal 13 of FIG. 3), and inputted into a buffer amplifier BUFF. The output terminal of BUFF is connected to a low-frequency output terminal RXout (RXout is connected to the phase comparator 5 of FIG. 3). As not shown, only high-frequency signals are extracted from TXout via a high or band pass filter, and only low-frequency signals are extracted from RXout via a low or band pass filter. BUFF prevents the property of the filter connected after RXout from influencing the output terminal 41 of MIX. Moreover, when the frequency converter is applied to a time division duplex (TDD) system, the filter may be unnecessary after TXout.

Figure 5:
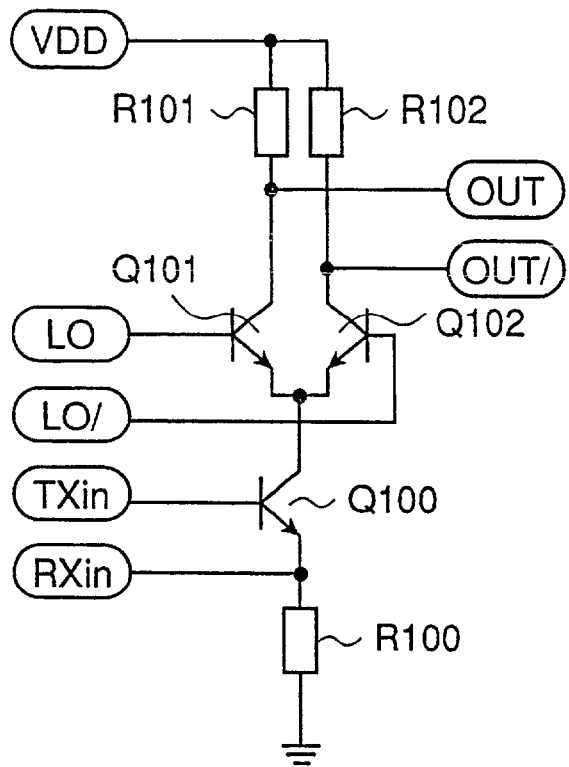
FIG. 5 is a circuit configuration diagram of the frequency converter 8.

FIG. 5 is a circuit configuration diagram showing one example of the frequency converter 8. Only the addition section of the signals shown in FIG. 4 and an multiplication section with the LO signal are shown. The buffer amplifier BUFF shown in FIG. 4 and not shown in FIG. 5 can easily be realized, for example, by an emitter follower circuit, and is therefore omitted here. A connection of the circuit will be described hereinafter.

An emitter terminal of a transistor Q100 is connected to the high-frequency input signal terminal RXin, and grounded via a resistor R100. A base terminal is connected to the low-frequency input terminal TXin, and a collector terminal is connected to a common emitter terminal of a differential pair of transistors Q101, Q102.

The base terminal of Q101 is connected to a local input terminal LO, and the collector terminal thereof is connected to an output terminal OUT and connected to a power terminal VDD via a load resistor R101. The base terminal of Q102 is connected to a local input terminal LO/, and the collector terminal thereof is connected to an output terminal OUT/ and connected to the power terminal VDD via a load resistor R102.

The differential pair of transistors perform an operation of switching and passing a current flowing through the collector terminal of Q100 to the resistor R101 or R102 in response to the local signal.

The addition of TXin and RXin signals is performed by the transistor Q100 and resistor R100. The TXin signal inputted into a base is converted to a current by a linear voltage current conversion circuit including the transistor Q100 and resistor R100, and outputted to the collector terminal of the transistor Q100.

On the other hand, for the RXin signal inputted into the emitter terminal of the transistor Q100, the current is split in a ratio of an inverse number of input impedance of the transistor Q100 to an inverse number of resistance value of the resistor R100 viewed from the emitter terminal, and the current inputted into the emitter terminal is outputted to the collector terminal substantially with a gain of 1. Therefore, a current proportional to the TXin signal and current proportional to the RXin signal are added and outputted to the collector terminal of the transistor Q100.

(Second Embodiment)

According to a second embodiment, there is provided a transmitter composed of combining the "Translation Loop", "Super-Heterodyne", and "Direct-Conversion" which can be used in six radio communication systems including: GSM900 and digital communication system (DCS) 1800 MHz (1800) using the GMSK modulation; W-CDMA using the HPSK modulation; and PHS, PDC (800 MHz band) and PDC (1500 MHz) using the π/4-QPSK modulation.

Figure 6:
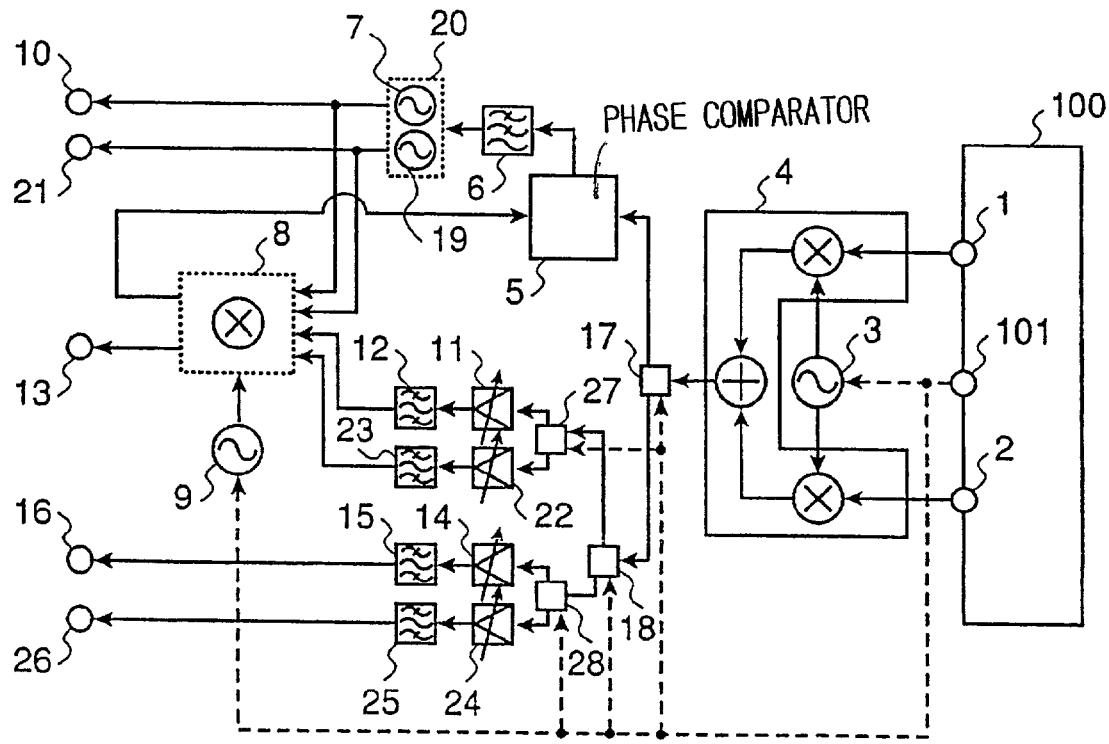
FIG. 6 is a block diagram of a transmitter composed of combining "Translation Loop", "Super-Heterodyne" and "Direct-Conversion" which can be used in six radio communication systems including: GSM900 and DCS1800 using the GMSK modulation; W-CDMA using the HPSK modulation; and PHS, PDC (800 MHz band) and PDC (1500 MHz) using the π/4-QPSK modulation according to a second embodiment of the present invention.

FIG. 6 is a block diagram of the multimode radio transmitter according to the second embodiment of the present invention, and shows a modification example of the third concrete example of the first embodiment.

In the radio transmitter of FIG. 6, a dual mode voltage control oscillator for GSM900/DCS1800 is used so that the transmitter can be used in another radio communication system DCS1800 suitable for the "Translation Loop". Another signal system of the "Super-Heterodyne" is added so that the transmitter can also be used in another radio communication system PHS suitable for the "Super-Heterodyne". Another signal system of the "Direct-Conversion" is added so that the transmitter can also be used in another radio communication system PDC (1500 MHz) suitable for the "Direct-Conversion".

In FIG. 6, since the components 1 to 18 are similar to those of FIG. 3, FIG. 3 is referred to, and the description thereof is omitted here. A reference numeral 19 denotes a second voltage control oscillator, 20 denotes a dual mode oscillator including the first and second voltage control oscillators, 21 denotes a second "Translation Loop" signal output terminal, 22 denotes a second variable gain amplifier for IF, 23 denotes a second band pass filter for IF, 24 denotes a second variable gain amplifier for RF, 25 denotes a second band pass filter for RF, 26 denotes a second signal output terminal for "Direct-Conversion", 27 denotes third quadrature modulator output signal segmenting means, and 28 denotes fourth quadrature modulator output signal segmenting means.

The third and fourth quadrature modulator output signal segmenting means 27, 28 are connected to a control signal line (shown by a dot line) from the control terminal 101 of the digital signal processor, and can segment the signals in response to the control signal.

To concretely describe the operation of the second embodiment of the present invention hereinafter, as one example, the use in the six radio communication systems including: GSM900 and DCS1800 suitable for the "Translation Loop"; W-CDMA and PHS suitable for the "Super-Heterodyne"; and PDC (800 MHz) and PDC (1500 MHz band) suitable for the "Direct-Conversion" will concretely be described.

Additionally, to concretely describe the operation of the present transmitter, the frequency configuration shown in the following Table 2 is used.

TABLE 2

Concrete Frequency Configuration (2) of Radio Communication System

| Radio communication system name | Signal band width | IF signal frequency | RF output signal frequency |
| --- | --- | --- | --- |
| GSM900 | 200 kHz | 95 MHz | 880 to 915 MHz |
| DCS1800 | 200 kHz | 95 MHz | 1710 to 1785 MHz |
| W-CDMA | 3.84 MHz | 380 MHz | 1920 to 1980 MHz |
| PHS | 384 MHz | 190 MHz | 1894 to 1919 MHz |
| PDC (800 MHz band) | 25 kHz | — | 887 to 958 MHz |
| PDC (1500 MHz band) | 25 kHz | — | 1429 to 1453 MHz |

Use in GSM900 and DCS1800)

The digital signal processor 100 inputs the base band signals of GSM900 and DCS1800 of I and Q channels, deviating in phase from each other by 90 degrees, into the quadrature modulator 4 via the I and Q channel base band signal input terminals 1, 2. The base band signals of GSM900 and DCS1800 are outputted from the first synthesizer 3 in the quadrature modulator 4. The signal is multiplied by the first LO signal with a frequency of 95 MHz, and frequency-converted to the first IF signal with a frequency of 95 MHz.

Subsequently, the first IF signal with a frequency of 95 MHz outputted from the quadrature modulator 4 is inputted into the phase comparator 5 through the first quadrature modulator output signal segmenting means 17.

On the other hand, the RF oscillator signal of GSM900 or DCS1800 outputted from the dual mode oscillator including the first and second voltage control oscillators 7, 19, and second LO signal outputted from the second synthesizer 9 are inputted into the frequency converter 8.

Here, the dual mode oscillator 20 including the first and second voltage control oscillators switches the included first and second voltage control oscillators 7, 19 depending on whether the signal to be transmitted is of GSM900 or DCS1800, and outputs the RF oscillator signal with an oscillation frequency corresponding to the value of the voltage supplied from the loop filter 6.

Here, the dual mode oscillator 20 including the first and second voltage control oscillators is taken as one example in order to concretely describe the second embodiment of the present invention. However, a method of using the voltage control oscillators for GSM900 and DCS1800 instead of the dual mode oscillator 20 including the first and second voltage control oscillators, and switching the oscillator by switching means such as a switch may be used.

Here, for the frequencies of two signals inputted into the frequency converter 8, with GSM900, the frequency of the RF oscillator signal is in a range of 880 to 915 MHz, and the frequency of the second LO signal is higher or lower than that of the RF oscillator signal by 95 MHz, that is, in a range of 975 to 1010 MHz or 785 to 820 MHz. Moreover, with DCS1800, the frequency of the RF oscillator signal is in a range of 1710 to 1785 MHz, and the frequency of the second LO signal is higher or lower than that of the RF oscillator signal by 95 MHz, that is, in a range of 1805 to 1880 MHz or 1615 to 1690 MHz.

In this case, with any one of GSM900 and DCS1800, any one of the frequencies higher and lower than the frequency of the second LO signal may be used.

The frequency converter 8 multiplies these two signals, generates the second IF signal with a frequency of 95 MHz, and outputs the signal to the phase comparator 5.

The phase comparator 5 detects the phase difference between the first IF signal outputted from the quadrature modulator 4 and the second IF signal outputted from the frequency converter 8, and outputs the voltage corresponding to the difference. When the phases of these two signals inputted into the phase comparator 5 are completely equal to each other, the voltage value outputted from the phase comparator 5 indicates a certain constant value. The frequency of the RF oscillator signal outputted from the dual mode oscillator 20 including the first and second voltage control oscillators indicates a constant value as such. However, when there is a phase difference between two IF signals, the value of the voltage outputted to the dual mode oscillator 20 including the first and second voltage control oscillators from the phase comparator 5 changes. The frequency of the RF oscillator signal outputted from the dual mode oscillator 20 including the first and second voltage control oscillators changes so that the frequencies of two IF signals inputted into the phase comparator 5 are equal.

Moreover, the RF oscillator signal outputted from the dual mode oscillator 20 including the first and second voltage control oscillators is outputted from the first "Translation Loop" signal output terminal 10 or the second "Translation Loop" signal output terminal 21 depending on whether the signal to be transmitted is of GSM900 or DCS1800.

(Use in W-CDMA and PHS)

The digital signal processor 100 inputs the base band signals of W-CDMA and PHS of the I and Q channels, deviating in phase from each other by 90 degrees, into the quadrature modulator 4 via the I and Q channel base band signal input terminals 1, 2. The base band signals of W-CDMA and PHS are multiplied by the first LO signal outputted from the first synthesizer 3 in the quadrature modulator 4, and frequency-converted to the IF signal of W-CDMA and PHS.

In this case, the frequency of the first LO signal outputted from the first synthesizer 3 is equal to the frequency of the IF signal of W-CDMA and PHS. That is, when the signal to be transmitted is of W-CDMA, the frequency of the first LO signal is 380 MHz. When the signal to be transmitted is of PHS, the frequency of the first LO signal is 190 MHz.

The IF signals of W-CDMA and PHS outputted from the quadrature modulator 4 are passed through the first and second quadrature modulator output signal segmenting means 17, 18, and inputted into the third quadrature modulator output signal segmenting means 27. In this case, similarly as the first and second quadrature modulator output signal segmenting means 17, 18, as the third quadrature modulator output signal segmenting means 27, concretely the switch for switching the signal path, diplexer for segmenting the pass path by the frequency, and the like are used.

The IF signals of W-CDMA and PHS inputted into the third quadrature modulator output signal segmenting means 27 are inputted into the first or second variable gain amplifier for IF 11 or 22 depending on whether the signal to be transmitted is a signal of W-CDMA or PHS to amplify power. An amplifier which can freely adjust and amplify the gain of the signal having a band width of 3.84 MHz at a frequency of 380 MHz in a limited range is used in the first variable gain amplifier for IF 11. An amplifier which can freely adjust and amplify the gain of the signal having a band width of 384 MHz at a frequency of 190 MHz in a limited range is used in the second variable gain amplifier for IF 22.

The IF signals of W-CDMA and PHS outputted from the first and second variable gain amplifiers for IF 11 and 22 are inputted into the first and second band pass filters for IF 12 and 23, respectively. A filter having a property of passing a signal having a band width of 3.84 MHz at a frequency of 380 MHz, and attenuating the other signals is used in the first band pass filter for IF 12. A filter having a property of passing a signal having a pass band width of 384 MHz at a frequency of 190 MHz, and attenuating the other signals is used in the second band pass filter for IF 23.

The unnecessary signals are removed from the IF signals of W-CDMA and PHS inputted into the first and second band pass filters for IF 12 and 23, and the IF signals are inputted into the frequency converter 8.

Here, for the concrete description of the present invention, it is assumed that the first variable gain amplifier for IF 11 and first band pass filter for IF 12 are designed for W-CDMA, and the second variable gain amplifier for IF 22 and second band pass filter for IF 23 are designed for PHS.

Here, the first variable gain amplifier for IF 11 and first band pass filter for IF 12 may be designed for PHS, and the second variable gain amplifier for IF 22 and second band pass filter for IF 23 may be designed for W-CDMA.

In the frequency converter 8, the IF signals of W-CDMA and PHS outputted from the first band pass filter for IF 12 and second band pass filter for IF 23 and the second LO signal outputted from the second synthesizer 9 are inputted.

Here, when the signal to be transmitted is a signal of W-CDMA, the frequency of the second LO signal is higher or lower than that of the RF output signal of 1920 to 1980 MHz by 380 MHz, that is, in a range of 2300 to 2360 MHz or 1540 to 1600 MHz. When the signal to be transmitted is a signal of PHS, the frequency is higher or lower than that of the RF output signal of 1894 to 1919 MHz by 190 MHz, that is, in a range of 2084 to 2109 MHz or 1704 to 1729

MHz. Moreover, in this case, in any one of W-CDMA and PHS, any one of the frequencies may be used.

Moreover, the two signals inputted into the frequency converter 8 are multiplied so that the frequency of the RF signal outputted from the frequency converter 8 is in a range of 1920 to 1980 MHz to transmit a signal of W-CDMA, and in a range of 1894 to 1919 MHz to transmit a signal of PHS.

Furthermore, the RF output signal of W-CDMA and PHS frequency-converted by the frequency converter 8 is outputted from the "Super-Heterodyne" signal output terminal 13.

(Use in PDC (800 MHz) and PDC (1500 MHz))

The digital signal processor 100 inputs the base band signals of PDC (800 MHz) and PDC (1500 MHz) of the I and Q channels, deviating in phase from each other by 90 degrees, into the quadrature modulator 4 via the I and Q channel base band signal input terminals 1, 2. The base band signals of PDC (800 MHz) and PDC (1500 MHz) are multiplied by the first LO signal outputted from the first synthesizer 3 in the quadrature modulator 4, and frequency-converted to the RF signals of the PDC (800 MHz) and PDC (1500 MHz). Here, the frequency of the first LO signal is in a range of 887 to 958 MHz for PDC (800 MHz), and in a range of 1429 to 1453 MHz for PDC (1500 MHz).

Subsequently, the RF signals of PDC (800 MHz) and PDC (1500 MHZ) outputted from the quadrature modulator 4 are passed through the first and second quadrature modulator output signal segmenting means 17, 18, and further inputted into the fourth quadrature modulator output signal segmenting means 28.

In this case, similarly as the first and second quadrature modulator output signal segmenting means 17, 18, as the fourth quadrature modulator output signal segmenting means 28, concretely the switch for switching the signal path, or the diplexer for segmenting the pass path by the frequency is used.

The RF signals of PDC (800 MHz) and PDC (1500 MHz) outputted from the fourth quadrature modulator output signal segmenting means 28 are inputted into the first or second variable gain amplifier for RF 14 or 24, to amplify power. An amplifier which can freely adjust and amplify the gain of the signal having a band width of 25 kHz at a frequency of 887 to 958 MHz in a limited range is used in the first variable gain amplifier for RF 14. An amplifier which can freely adjust and amplify the gain of the signal having a band width of 25 kHz at a frequency of 1429 to 1453 MHz in a limited range is used in the second variable gain amplifier for RF 24.

The RF signals of PDC (800 MHz) and PDC (1500 MHz) outputted from the first or second variable gain amplifier for RF 14 or 24 are passed through the first or second band pass filter for RF 15 or 25, and the unnecessary signals are removed.

A filter having a property of passing a signal having a band width of 25 kHz at a frequency of 887 to 958 MHz, and attenuating the other signals is used in the first band pass filter for RF 15. A filter having a property of passing a signal having a band width of 25 kHz at a frequency of 1429 to 1453 MHz, and attenuating the other signals is used in the second band pass filter for RF 25.

The RF signals of PDC (800 MHz) and PDC (1500 MHz) outputted from the first or second band pass filter for RF 15 or 25 are outputted from the first or second signal output terminal for the "Direct-Conversion" 16 or 26.

As described above, in the second embodiment, the quadrature modulator and frequency converter heretofore disposed separately for GSM900, DCS1800, W-CDMA, PHS, PDC (800 MHz) and PDC (1500 MHz) are used in common, and thereby the number of constituting elements is decreased. The transmitter can operate as the "Translation Loop", "Super-Heterodyne", or "Direct-Conversion". When this transmitter is used, a small-sized and lightweight transmitter of the "multimode radio apparatus" can be realized.

Additionally, in the description of the operation of the second embodiment according to the present invention, GSM900 and DCS1800 are used as the radio communication systems suitable for the "Translation Loop", W-CDMA and PHS are used as the radio communication systems suitable for the "Super-Heterodyne", and PDC (800 MHz) and PDC (1500 MHz) are used as the radio communication systems suitable for the "Direct-Conversion". However, the combination of the radio method and radio communication system may sometimes be different from the combination used in the operation description.

(Third Embodiment)

According to a third embodiment, there is provided a transmitter composed of combining "Translation Loop", "Super-Heterodyne", and "Direct-Conversion" which can be used in six radio communication systems including: GSM900 and DCS1800 using the GMSK modulation; W-CDMA using the HPSK modulation; PHS, PDC (800 MHz band) and PDC (1500 MHz band) using the π/4-QPSK modulation, and the transmitter uses the variable gain amplifier for IF in the "Super-Heterodyne" in common in two systems.

Figure 7:
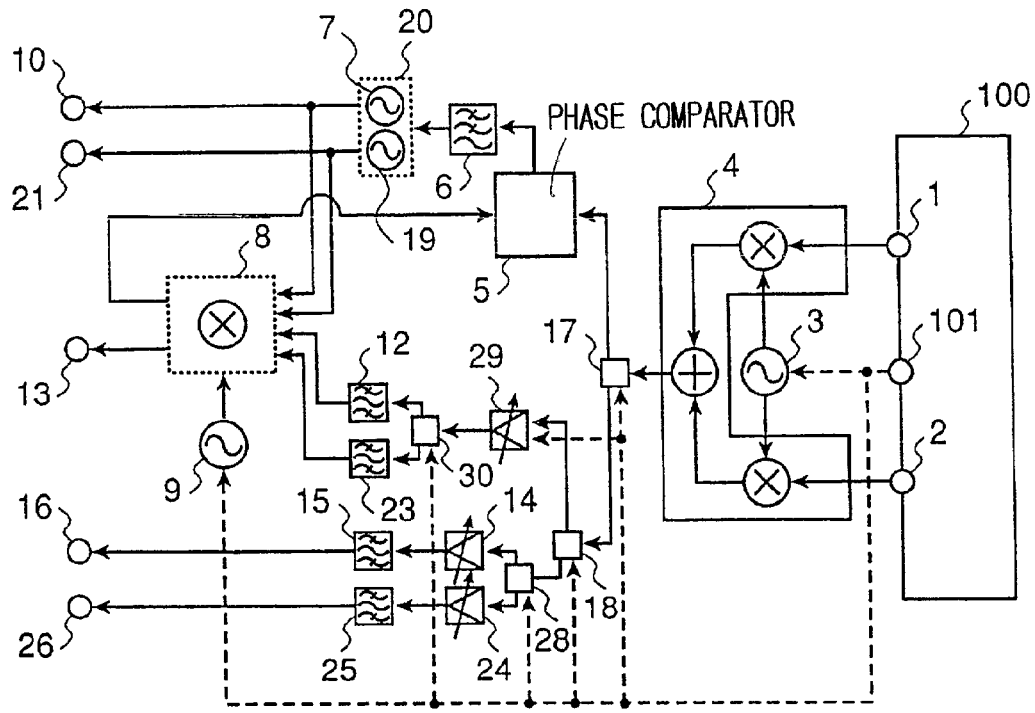
FIG. 7 is a block diagram of a transmitter composed of combining "Translation Loop", "Super-Heterodyne" and "Direct-Conversion" which can be used in six radio communication systems including: GSM900 and DCS1800 using the GMSK modulation; W-CDMA using the HPSK modulation; and PHS, PDC (800 MHz band) and PDC (1500 MHz band) using the π/4-QPSK modulation according to a third embodiment of the present invention, and the transmitter uses a variable gain amplifier for IF in the "Super-Heterodyne" in common in two systems.

FIG. 7 is a block diagram of the multimode radio transmitter according to the third embodiment of the present invention. This is a modification example of the second embodiment. That is, FIG. 7 shows the transmitter in which the variable gain amplifier for IF is shared in two radio communication systems W-CDMA and PHS suitable for the "Super-Heterodyne".

In FIG. 7, since the components 1 to 29 are similar to those of FIG. 6, FIG. 6 is referred to, and the description thereof is omitted here. A reference numeral 29 denotes a third variable gain amplifier for IF, and 30 denotes first IF variable gain amplifier output signal segmenting means.

The first IF variable gain amplifier output signal segmenting means 30 is connected to the control signal (communication method control signal) line (shown by a dot line in FIG. 7) from the control terminal 101 of the digital signal processor, and can segment the signal in response to the control signal.

To concretely describe the operation of the third embodiment of the present invention hereinafter, as one example, the use in the six radio communication systems including: GSM900 and DCS1800 suitable for the "Translation Loop"; W-CDMA and PHS suitable for the "Super-Heterodyne"; and PDC (800 MHz) and PDC (1500 MHz band) suitable for the "Direct-Conversion" will concretely be described.

The operation of the third embodiment is different from the operation of the second embodiment only in the operation using the "Super-Heterodyne", and therefore only this different respect will be described here. For the other operations, the second embodiment is referred to, and the description thereof is omitted.

Additionally, to concretely describe the operation of the third embodiment of the present invention, the frequency configuration shown in the following Table 3 is used.

TABLE 3

Concrete Frequency Configuration (3) of Radio Communication System

| Radio communication system name | Signal band width | IF signal frequency | RF output signal frequency |
| --- | --- | --- | --- |
| PHS | 384 MHz | 190 MHz | 1894 to 1919 MHz |
| W-CDMA | 3.84 MHz | 380 MHz | 1920 to 1980 MHz |

The digital signal processor 100 inputs the base band signals of W-CDMA and PHS of the I and Q channels, deviating in phase from each other by 90 degrees, into the second quadrature modulator output signal segmenting means 18, similarly as the first embodiment of the present invention.

The IF signals of W-CDMA and PHS outputted from the second quadrature modulator output signal segmenting means 18 is inputted into the third variable gain amplifier for IF 29 designed such that the amplifier can be shared both in W-CDMA and PHS. An amplifier which can freely adjust and amplify the gain of the signal having a band width of 384 kHz to 3.84 MHz at a frequency of 190 MHz to 380 MHz in a limited range is used in the third variable gain amplifier for IF 29.

The IF signals of W-CDMA and PHS inputted into the third variable gain amplifier for IF 29 are inputted into the first IF variable gain amplifier output signal segmenting means 30. The first IF variable gain amplifier output signal segmenting means 30 inputs the signal into the first or second band pass filter for IF 12 or 23 depending on whether the inputted IF signal is the signal of W-CDMA or PHS.

Subsequently, after the unnecessary signals are removed from the IF signals of W-CDMA and PHS inputted into the first and second band pass filters for IF 12 and 23, the IF signals are inputted into the frequency converter 8. A filter having a property of passing a signal having a pass band width of 3.84 MHz at a frequency of 380 MHz, and attenuating the other signals is used in the first band pass filter for IF 12. A filter having a property of passing a signal having a pass band width of 384 kHz at a frequency of 190 MHz, and attenuating the other signals is used in the second band pass filter for IF 23.

Here, for the concrete description of the present invention, it is assumed that the first band pass filter for IF 12 is designed for W-CDMA, and the second band pass filter for IF 23 is designed for PHS. Here, the first band pass filter for IF 12 may be a band pass filter for IF designed for PHS, and the second band pass filter for IF 23 may be a band pass filter designed for W-CDMA.

In the frequency converter 8, the IF signals of W-CDMA and PHS outputted from the first and second band pass filters for IF 12 and 23 and the second LO signals of W-CDMA and PHS outputted from the second synthesizer 9 are inputted.

Here, for the frequencies of the second LO signals of W-CDMA and PHS, when the signal to be transmitted is a signal of W-CDMA, the frequency is higher or lower than that of the RF output signal of 1920 to 1980 MHz by 380 MHz, that is, in a range of 2300 to 2360 MHz or 1540 to 1600 MHz. When the signal to be transmitted is of PHS, the frequency is higher or lower than that of the RF output signal of 1894 to 1919 MHz by 190 MHz, that is, in a range of 2084 to 2109 MHz or 1704 to 1729 MHz.

In this case, any one of high and low frequencies may be used as the second LO signal.

In the frequency converter 8, the two signals are multiplied so that the frequency of the output signal subjected to the frequency conversion is in a range of 1920 to 1980 MHz for W-CDMA, and in a range of 1894 to 1919 MHz for PHS. Subsequently, the output signal frequency-converted by the frequency converter 8 is outputted from the "Super-Heterodyne" signal output terminal 13.

As described above, in the third embodiment of the present invention, the quadrature modulator and frequency converter heretofore disposed separately for GSM900, DCS1800, W-CDMA, PHS, PDC (800 MHz) and PDC (1500 MHz) are used in common, the variable gain amplifier for IF heretofore disposed separately for W-CDMA and PHS is used in common, and thereby the number of constituting elements is decreased. The transmitter can operate as the "Translation Loop", "Super-Heterodyne", or "Direct-Conversion". When this transmitter is used, the small-sized and lightweight transmitter of the "multimode radio apparatus" can be realized.

Additionally, here, the uses of GSM900 and DCS1800 as the radio communication systems suitable for the "Translation Loop", W-CDMA and PHS as the radio communication systems suitable for the "Super-Heterodyne", and PDC (800 MHz) and PDC (1500 MHz) as the radio communication systems suitable for the "Direct-Conversion" have been described. However, the combination of the radio method and radio communication system may sometimes be different from the combination used in the operation description.

(Fourth Embodiment)

According to a fourth embodiment, there is provided a transmitter composed of combining "Translation Loop", "Super-Heterodyne", and "Direct-Conversion" which can be used in seven radio communication systems including: GSM900 and DCS1800 using the GMSK modulation; W-CDMA using the HPSK modulation; PHS, PDC (800 MHz) and PDC (1500 MHz band) using the π/4-QPSK modulation; and narrow-band CDMA (N-CDMA) using the binary PSK (BPSK) modulation.

Figure 8:
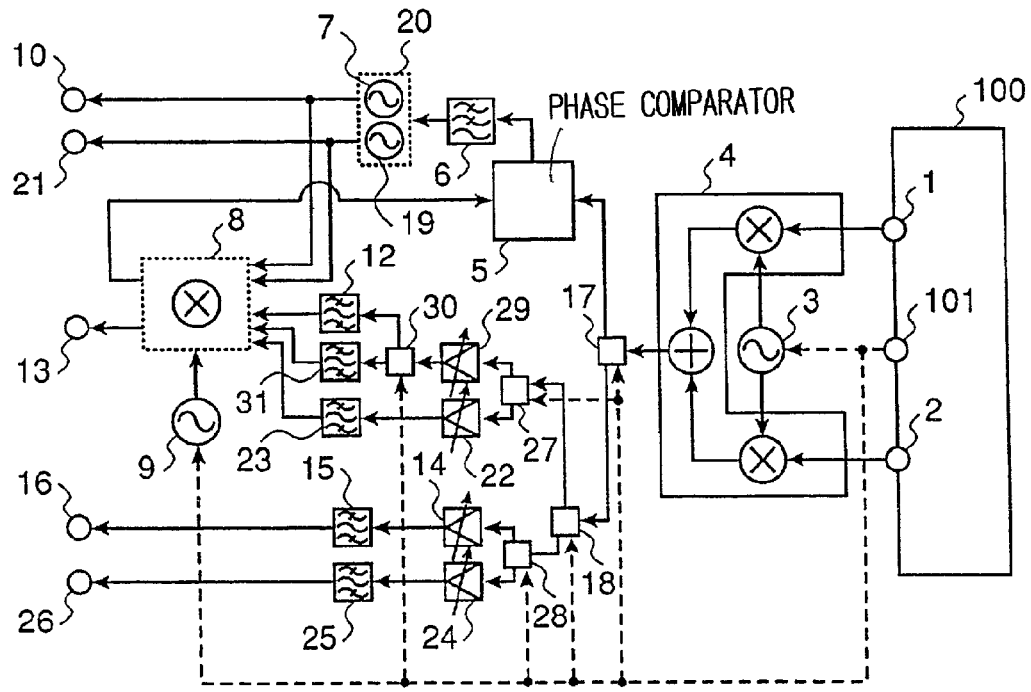
FIG. 8 is a block diagram of a transmitter composed of combining "Translation Loop", "Super-Heterodyne" and "Direct-Conversion" which can be used in seven radio communication systems including: GSM900 and DCS1800 using the GMSK modulation; W-CDMA using the HPSK modulation; PHS, PDC (800 MHz) and PDC (1500 MHz band) using the π/4-QPSK modulation; and N-CDMA using a BPSK modulation according to a fourth embodiment of the present invention.

FIG. 8 is a block diagram of a multimode radio transmitter according to the fourth embodiment of the present invention, and shows a modification example of the third embodiment.

That is, another signal system of the "Super-Heterodyne" is added so that the transmitter can also be used in another radio communication system N-CDMA suitable for the "Super-Heterodyne", and the variable gain amplifier for IF for use in the "Super-Heterodyne" is used in common in two radio communication systems.

In FIG. 8, since the components 1 to 30 are similar to those of FIGS. 6 and 7, FIGS. 6 and 7 are referred to, and the description thereof is omitted here. A reference numeral 31 denotes a third band pass filter for IF.

To concretely describe the operation of the fourth embodiment of the present invention hereinafter, as one example, the use in the seven radio communication systems including: GSM900 and DCS1800 suitable for the "Translation Loop"; W-CDMA, PHS and N-CDMA suitable for the "Super-Heterodyne"; and PDC (800 MHz) and PDC (1500 MHz band) suitable for the "Direct-Conversion" will concretely be described.

The operation of the fourth embodiment is different from the operation of the second embodiment only in the operation using the "Super-Heterodyne", and therefore only this different respect will be described here. For the other operations, the second embodiment is referred to, and the description thereof is omitted.

To concretely describe the operation of the fourth embodiment of the present invention, the frequency configuration shown in the following Table 4 is used.

TABLE 4

Concrete Frequency Configuration (4) of Radio Communication System

| Radio communication system name | Signal band width | IF signal frequency | RF output signal frequency |
|---|---|---|---|
| PHS | 384 MHz | 190 MHz | 1894 to 1919 MHz |
| W-CDMA | 3.84 MHz | 380 MHz | 1920 to 1980 MHz |
| N-CDMA | 1.23 MHz | 260 MHz | 824 to 849 MHz |

The digital signal processor 100 inputs the base band signals of W-CDMA, PHS and N-CDMA of the I and Q channels, deviating in phase from each other by 90 degrees, into the quadrature modulator 4 via the I and Q channel base band signal input terminals 1, 2. The base band signals of W-CDMA, PHS and N-CDMA are multiplied by first LO signals of W-CDMA, PHS and N-CDMA outputted from the first synthesizer 3 in the quadrature modulator 4, and frequency-converted to the IF signals of W-CDMA, PHS and N-CDMA.

In this case, the frequency of the first LO signal outputted from the first synthesizer 3 is equal to the IF signal frequency of W-CDMA, PHS and N-CDMA. That is, when the signal to be transmitted is of W-CDMA, the frequency of the first LO signal is 380 MHz. When the signal to be transmitted is of PHS, the frequency of the first LO signal is 190 MHz. When the signal to be transmitted is of N-CDMA, the frequency of the first LO signal is 260 MHz.

The IF signals outputted from the quadrature modulator 4 are passed through the first and second quadrature modulator output signal segmenting means 17, 18, and inputted into the third quadrature modulator output signal segmenting means 27.

Moreover, the third quadrature modulator output signal segmenting means 27 segments the signal, and inputs the signal into the second variable gain amplifier for IF 22, or the third variable gain amplifier for IF 29 designed so that the amplifier can be used in common in two systems, depending on whether the inputted signal is of W-CDMA, PHS, or N-CDMA.

Here, for the concrete description of the operation of the present invention, it is assumed that the second variable gain amplifier for IF 22 is designed for PHS, and the third variable gain amplifier for IF 29 is designed such that the amplifier can be used in common in W-CDMA and N-CDMA. The amplifier which can freely adjust and amplify the gain of the signal having a band width of 384 kHz at a frequency of 190 MHz in the limited range is used in the second variable gain amplifier for IF 22. The amplifier which can freely adjust and amplify the gain of the signal having a band width of 1.23 MHz to 3.84 MHz at a frequency of 260 to 380 MHz in the limited range is used in the third variable gain amplifier for IF 29.

When the IF signal inputted into the third quadrature modulator output signal segmenting means 27 is an IF signal of PHS, the IF signal of PHS is inputted into the second variable gain amplifier for IF 22, amplified, and inputted into the second band pass filter for IF 23. The filter having a property of passing the signal having a pass band width of 384 kHz at a frequency of 190 MHz, and attenuating the other signals is used in the second band pass filter for IF 23.

Subsequently, after the unnecessary signal is removed, the IF signal is inputted into the frequency converter 8.

On the other hand, when the IF signal inputted into the third quadrature modulator output signal segmenting means 27 is an IF signal of W-CDMA and N-CDMA, the IF signal of W-CDMA and N-CDMA is inputted into the third variable gain amplifier for IF 29, amplified, and inputted into the first IF variable gain amplifier output signal segmenting means 30.

The signal of W-CDMA or N-CDMA inputted into the first IF variable gain amplifier output signal segmenting means 30 is inputted into the first band pass filter for IF 12 or the third band pass filter for IF 31 depending on the signal of W-CDMA or N-CDMA.

Here, for the concrete description of the present invention, it is assumed that the first band pass filter for IF 12 is designed for W-CDMA and the third band pass filter for IF 31 is designed for N-CDMA. Here, the first band pass filter for IF 12 may be designed for N-CDMA, and the third band pass filter for IF 31 may be designed for W-CDMA. The filter having a property of passing the signal having a pass band width of 3.84 MHz at a frequency of 380 MHz, and attenuating the other signals is used in the first band pass filter for IF 12. The filter having a property of passing the signal having a pass band width of 1.23 MHz at a frequency of 260 MHz, and attenuating the other signals is used in the third band pass filter for IF 31.

After the unnecessary signals are removed from the signals of W-CDMA and N-CDMA inputted into the first and third band pass filters for IF 12 and 31, the signals are inputted into the frequency converter 8.

In the frequency converter 8, the IF signals of W-CDMA, PHS and N-CDMA outputted from the first, second and third band pass filters for IF 12, 23 and 31, and the second LO signals of W-CDMA, PHS and N-CDMA outputted from the second synthesizer 9 are inputted.

Here, when the signal to be transmitted is of PHS, the frequency of the second LO signal is higher or lower than that of the RF output signal of 1894 to 1919 MHz by 190 MHz, that is, in a range of 2084 to 2109 MHz or 1704 to 1729 MHz. When the signal is of W-CDMA, the frequency is higher or lower than that of the RF output signal of 1920 to 1980 MHz by 380 MHz, that is, in a range of 2300 to 2360 MHz or 1540 to 1600 MHz. When the signal is of N-CDMA, the frequency is higher or lower than that of the RF output signal of 824 to 849 MHz by 260 MHz, that is, in a range of 1084 to 1109 MHz or 564 to 589 MHz. In this case, any one of the frequencies can be used in any one of the systems.

Moreover, the frequency converter 8 multiplies two signals so that the frequency of the frequency-converted output signal is the RF output signal frequency of W-CDMA, PHS and N-CDMA.

Subsequently, the RF signals of W-CDMA, PHS and N-CDMA frequency-converted in the frequency converter 8 are outputted from the "Super-Heterodyne" signal output terminal 13.

As described above, in the fourth embodiment of the present invention, the quadrature modulator and frequency converter heretofore disposed separately for GSM900, DCS1800, W-CDMA, N-CDMA, PHS, PDC (800 MHz) and PDC (1500 MHz) are used in common, and thereby the number of constituting elements is decreased. The transmitter can operate as the "Translation Loop", "Super-Heterodyne", or "Direct-Conversion". When this transmitter is used, the small-sized and lightweight transmitter of the "multimode radio apparatus" can be realized.

Additionally, here, the uses of GSM900 and DCS1800 as the radio communication systems suitable for the "Translation Loop", W-CDMA, N-CDMA and PHS as the radio communication systems suitable for the "Super-Heterodyne", and PDC (800 MHz) and PDC (1500 MHz) as the radio communication systems suitable for the "Direct-Conversion" have been described. However, the combination of the radio method and radio communication system may sometimes be different from the combination used in the operation description.

(Fifth Embodiment)

According to a fifth embodiment, there is provided a transmitter composed of combining "Translation Loop", "Super-Heterodyne", and "Direct-Conversion" which can be used in the six radio communication systems including: GSM900 and DCS1800 using the GMSK modulation; W-CDMA using the HPSK modulation; and PHS, PDC (800 MHz band) and PDC (1500 MHz) using the π/4-QPSK modulation, and the transmitter uses the variable gain amplifier for RF in the "Direct-Conversion" in common in two systems.

FIG. 9 is a block diagram of a multimode radio transmitter according to the fifth embodiment of the present invention, and shows a modification example of the second embodiment.

That is, the variable gain amplifier for RF heretofore disposed separately for the radio communication systems PDC (800 MHz) and PDC (1500 MHz) suitable for the "Direct-Conversion" is used in common in the fifth embodiment.

In FIG. 9, since the components 1 to 27 are similar to those of FIG. 6, FIG. 6 is referred to, and the description thereof is omitted here. A reference numeral 32 denotes a third variable gain amplifier for RF, and 33 denotes first variable gain amplifier output signal segmenting means for RF.

The first variable gain amplifier output signal segmenting means for RF 33 is connected to the control signal line (shown by the dot line) from the control terminal 101 of the digital signal processor, and can segment the signal in response to the control signal.

To concretely describe the operation of the fifth embodiment of the present invention hereinafter, as one example, the uses in the six radio communication systems including: GSM900 and DCS1800 suitable for the "Translation Loop"; W-CDMA and PHS suitable for the "Super-Heterodyne"; and PDC (800 MHz) and PDC (1500 MHz band) suitable for the "Direct-Conversion" will concretely be described.

Since the operation of the fourth embodiment is different from the operation of the second embodiment only in the operation using the "Direct-Conversion", only this different respect will be described here. For the other operations, the second embodiment is referred to, and the description thereof is omitted here.

To concretely describe the operation of the fifth embodiment of the present invention, the frequency configuration shown in the following Table 5 is used.

TABLE 5

Concrete Frequency Configuration (5) of Radio Communication System

| Radio communication system name | Signal band width | IF signal frequency | RF output signal frequency |
|---|---|---|---|
| PDC (800 MHz band) | 25 kHz | — | 887 to 958 MHz |
| PDC (1500 MHz band) | 25 kHz | — | 1429 to 1453 MHz |

The digital signal processor 100 inputs the base band signals of PDC (800 MHz) and PDC (1500 MHz) of I and Q channels, deviating in phase from each other by 90 degrees, into the second quadrature modulator output signal segmenting means 18 similarly as the second embodiment of the present invention.

In this case, the frequency of the first LO signal outputted from the first synthesizer 3 is equal to the RF signal frequency of PDC (800 MHz) and PDC (1500 MHz). That is, when the signal to be transmitted is of PDC (800 MHz), the frequency of the first LO signal is 887 to 958 MHz. When the signal to be transmitted is of PDC (1500 MHz), the frequency of the first LO signal is 1429 to 1453 MHz.

The RF signals of PDC (800 MHz) and PDC (1500 MHz) inputted into the second quadrature modulator output signal segmenting means 18 are inputted into the third variable gain amplifier for RF 32, amplified, and inputted into the first variable gain amplifier output signal segmenting means for RF 33. The amplifier which can freely adjust and amplify the gain of the signal having a band width of 25 kHz at a frequency of 887 to 1453 MHz in the limited range is used in the third variable gain amplifier for RF 32. Moreover, as the first variable gain amplifier output signal segmenting means for RF 33, concretely the switch for switching the signal path, the diplexer for segmenting the pass path by the frequency, and the like are used.

The RF signal inputted into the first variable gain amplifier output signal segmenting means for RF 33 is inputted into the first or second band pass filter for RF 15 or 25 depending on the RF signal of PDC (800 MHz) or PDC (1500 MHz).

Here, for the concrete description of the present invention, it is assumed that the first band pass filter for RF 15 is designed for PDC (800 MHz), and the second band pass filter for RF 25 is designed for PDC (1500 MHz). The first band pass filter for RF 15 may also be designed for PDC (800 MHz), and the second band pass filter for RF 25 may also be designed for PDC (1500 MHz). The filter having a property of passing the signal having a pass band width of 25 kHz at a frequency of 887 to 958 MHz, and attenuating the other signals is used in the first band pass filter for RF 15. The filter having a property of passing the signal having a pass band width of 25 kHz at a frequency of 1429 to 1453 MHz, and attenuating the other signals is used in the second band pass filter for RF 25.

The signals of PDC (800 MHz) or PDC (1500 MHz) inputted into the first and second band pass filters for RF 15 and 25 are outputted from the first and second signal output terminals for the "Direct-Conversion" 16 and 26.

As described above, in the fifth embodiment, the quadrature modulator and frequency converter heretofore disposed separately for GSM900, DCS1800, W-CDMA, PHS, PDC (800 MHz) and PDC (1500 MHz) are used in common, the variable gain amplifier for RF heretofore disposed separately for PDC (800 MHz) and PDC (1500 MHz) is used in common, and thereby the number of constituting elements is decreased. The transmitter can operate as the "Translation Loop", "Super-Heterodyne", or "Direct-Conversion". When this transmitter is used, the small-sized and lightweight transmitter of the "multimode radio apparatus" can be realized.

Additionally, here, the uses of GSM900 and DCS1800 as the radio communication systems suitable for the "Translation Loop", W-CDMA and PHS as the radio communication systems suitable for the "Super-Heterodyne", and PDC (800 MHz) and PDC (1500 MHz) as the radio communication systems suitable for the "Direct-Conversion" have been described. However, combinations of the radio method and radio communication system other than these combinations may also be used.

(Sixth Embodiment; a transmitter composed of combining "Translation Loop", "Super-Heterodyne" and "Direct-Conversion" which can be used in the five radio communication systems including: GSM900 using the GMSK modulation; W-CDMA using the HPSK modulation; and PDC (800 MHz band) and PDC (1500 MHz) and PHS using the π/4-QPSK modulation, and using IF and RF band variable band pass filters)

FIG. 10 is a block diagram of the multimode radio transmitter according to a sixth embodiment of the present invention, and shows a modification example of the second embodiment.

That is, a variable gain amplifier for IF and an IF band variable band pass filter 34 which can be used in PHS and W-CDMA, and a variable gain amplifier for RF and an RF band variable band pass filter 35 which can be used in PDC (800 MHz band) and PDC (1500 MHz) are used. Therefore, the amplifiers and filters can be used in another radio communication system PHS suitable for the "Super-Heterodyne" and another radio communication system PDC (1500 MHz) suitable for the "Direct-Conversion".

Different from the first to fifth embodiments, the sixth embodiment is characterized in the use of a filter which can freely change a central frequency and pass band width in a certain limited frequency range as the band pass filters for IF and RF.

In FIG. 10, since the components 1 to 29 are similar to those of FIG. 6, FIG. 6 is referred to, and the description thereof is omitted here. A reference numeral 32 denotes the third variable gain amplifier for RF, 34 denotes the IF band variable band pass filter, and 35 denotes the RF band variable band pass filter.

Here, as described above, the IF band variable band pass filter 34 and RF band variable band pass filter 35 are band pass filters for IF and RF, which can freely change the central frequency and pass band width in accordance with the frequency of the inputted signal and signal band width.

To concretely describe the operation of the sixth embodiment of the present invention hereinafter, as one example, the uses in the three radio communication systems including: GSM900 suitable for the "Translation Loop"; W-CDMA suitable for the "Super-Heterodyne"; and PDC (800 MHz) suitable for the "Direct-Conversion" will be described.

The operation of the sixth embodiment is different from the operation of the first embodiment only in the operation using the "Super-Heterodyne" and "Direct-Conversion", and therefore only this different respect will be described here. For the other operations, the first embodiment is referred to, and the description thereof is omitted.

Additionally, to concretely describe the operation of the present transmission section, the frequency configuration shown in the following Table 6 is used.

TABLE 6

Concrete Frequency Configuration (6) of Radio Communication System

| Radio communication system name | Signal band width | IF signal frequency | RF output signal frequency |
|---|---|---|---|
| GSM900 | 200 kHz | 95 MHz | 880 to 915 MHz |
| W-CDMA | 3.84 MHz | 380 MHz | 1920 to 1980 MHz |
| PHS | 384 kHz | 190 MHz | 1894 to 1919 MHz |

TABLE 6-continued

Concrete Frequency Configuration (6) of Radio Communication System

| Radio communication system name | Signal band width | IF signal frequency | RF output signal frequency |
|---|---|---|---|
| PDC (800 MHz band) | 25 kHz | — | 887 to 958 MHz |
| PDC (1500 MHz) | 25 kHz | — | 1429 to 1453 MHz |

(Operation in W-CDMA and PHS)

The digital signal processor 100 inputs the base band signals of W-CDMA and PHS of the I and Q channels, deviating in phase from each other by 90 degrees, into the second quadrature modulator output signal segmenting means 18, similarly as the second embodiment of the present invention.

The signals of W-CDMA and PHS inputted into the second quadrature modulator output signal segmenting means 18 is inputted into the third variable gain amplifier for IF 29.

The amplifier which can freely adjust and amplify the gain of the signal having a band width of 384 kHz to 3.84 MHz at a frequency of 190 to 380 MHz in the limited range is used in the third variable gain amplifier for IF 29. Concretely, the amplifier has a property of being capable of amplifying the signal having a frequency of 380 MHz and a band width of 3.84 MHz, when the IF signal of W-CDMA is inputted, and being capable of amplifying the signal having a frequency of 190 MHz and band width of 384 kHz, when the signal of PHS is inputted.

The third variable gain amplifier for IF 29 amplifies the inputted IF signals of W-CDMA and PHS, and outputs the signals to the IF band variable band pass filter 34. The unnecessary signals are removed from the IF signals of W-CDMA and PHS inputted into the IF band variable band pass filter 34, and the IF signals are outputted to the frequency converter 8.

In this IF band variable band pass filter 34, a filter having a property of being capable of setting the central frequency in a range of 190 MHz to 380 MHz, being capable of changing the pass band width in a range of 384 kHz to 3.84 MHz, passing the signals in the pass band, and attenuating the other signals is used. Concretely, when the signal of W-CDMA is inputted, the central frequency is set to 380 MHz, and the pass band width is set to 3.84 MHz. When the signal of PHS is inputted, the central frequency is set to 190 MHz, and the pass band width is set to 384 kHz. Subsequently, the filter operates to pass the signal in the pass band and attenuate the other signals.

In the frequency converter 8, the IF signals of W-CDMA and PHS outputted from the IF band variable band pass filter 34 and the second LO signals of W-CDMA and PHS outputted from the second synthesizer 9 are inputted.

Here, when the signal to be transmitted is of PHS, the frequency of the second LO signal is higher or lower than that of the RF output signal of PHS by 190 MHz, that is, in a range of 2084 to 2109 MHz or 1704 to 1729 MHz. When the signal is of W-CDMA, the frequency is higher or lower than that of the RF output signal of W-CDMA by 380 MHz, that is, in a range of 2300 to 2360 MHz or 1540 to 1600 MHz.

In this case, any one of high and low frequencies may be used as the frequencies of the second LO signals of W-CDMA and PHS.

Subsequently, the frequency converter 8 multiplies two signals so that the frequency of the frequency-converted RF signal is in a range of 1920 to 1980 MHz in W-CDMA, and in a range o f1894 to 1919 MHz in PHS.

Subsequently, the RF signal frequency-converted in the frequency converter 8 is outputted from the "Super-Heterodyne" signal output terminal 13.

As described above, in the sixth embodiment, the quadrature modulator and frequency converter heretofore disposed separately for GSM900, W-CDMA, PHS, PDC (800 MHz) and PDC (1500 MHz) are used in common. Moreover, the IF variable gain amplifier and band pass filter heretofore disposed separately for W-CDMA and PHS, and the IF variable gain amplifier and band pass filter heretofore disposed separately for PDC (800 MHz) and PDC (1500 MHz) are used in common. Thereby, the number of constituting elements is decreased. The transmitter can operate as the "Translation Loop", "Super-Heterodyne", or "Direct-Conversion". When this transmitter is used, the small-sized and lightweight transmitter of the "multimode radio apparatus" can be realized.

Additionally, here, the uses of GSM900 as the radio communication system suitable for the "Translation Loop", W-CDMA and PHS as the radio communication systems suitable for the "Super-Heterodyne", and PDC (800 MHz) and PDC (1500 MHz) as the radio communication systems suitable for the "Direct-Conversion" have been described. However, the combinations of the radio method and radio communication system other than the above-described combinations may also be used.

(Seventh Embodiment)

According to a seventh embodiment, there is provided a transmitter composed of combining "Translation Loop", "Super-Heterodyne", and "Direct-Conversion" which can be used in the three radio communication systems including: GSM900 using the GMSK modulation; W-CDMA using the HPSK modulation; and PDC (800 MHz band) using the π/4-QPSK modulation, and the transmitter uses the variable gain amplifier and band pass filter which operate at IF and RF.

Figure 11:
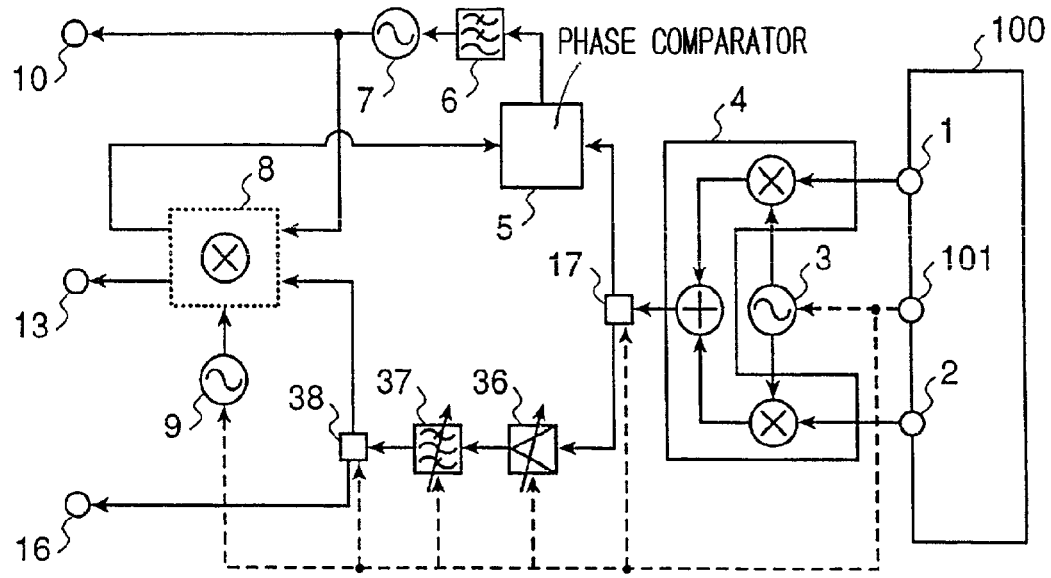
FIG. 11 is a block diagram of a transmitter composed of combining "Translation Loop", "Super-Heterodyne", and "Direct-Conversion" which can be used in three radio communication systems including: GSM900 using the GMSK modulation; W-CDMA using the HPSK modulation; and PDC (800 MHz band) using the π/4-QPSK modulation according to a seventh embodiment of the present invention, and the transmitter uses the variable gain amplifier and band pass filter which operate at IF and RF.

FIG. 11 is a block diagram of the multimode radio transmitter according to the seventh embodiment of the present invention, and shows a modification example of the first embodiment.

That is, the IF and RF variable gain amplifiers and band pass filters for use in the "Super-Heterodyne" and "Direct-Conversion" are changed to the variable gain amplifier which can be used both in IF and RF, and band pass filter which can be used both in IF and RF and freely change the pass band width.

Different from the first to sixth embodiments, the seventh embodiment is characterized in the use of the filter which can be used in an IF to RF frequency band and can freely change the central frequency and pass band width in the certain limited frequency range as the band pass filter for IF and RF. Examples of a control method concerning the operation of the filter include a method of setting the filter so that the control signal is supplied from a base band signal processor (not shown) and the filter has a desired pass band property. However, the present invention does not depend on these control methods, and other control methods may be used.

In FIG. 11, since the components 1 to 17 are similar to those of FIG. 3, FIG. 3 is referred to, and the description thereof is omitted here. A reference numeral 36 denotes a variable gain amplifier for IF and RF, 37 denotes an IF and RF band variable band pass filter, and 38 denotes IF and RF band variable band pass filter output signal segmenting means.

The IF and RF band variable band pass filter output signal segmenting means 38 is connected to a control signal line (shown by a dot line) from the control terminal 101 of the digital signal processor, and can segment the signal in response to the control signal.

Here, the variable gain amplifier for IF and RF 36 is an amplifier having a broad frequency application range in which an amplification operation is possible even with the above-described inputted signal of IF or RF. Concretely, the amplifier is used which can freely adjust and amplify the signal having a band width of 25 kHz to 3.84 MHz at a frequency of 380 to 1980 MHz in the certain limited range.

Moreover, the IF and RF band variable band pass filter 37 is a band pass filter being capable of freely changing the pass band width even when the inputted signal is a signal of IF or RF, and having a broad frequency application range in which the operation of the filter is possible. Concretely, the filter is used which has a function of being capable of setting the central frequency in a range of 380 to 1980 MHz and changing the pass band width in a range of 25 kHz to 3.84 MHz, and has a property of passing the signals in the pass band and attenuating the other signals.

To concretely describe the operation of the seventh embodiment of the present invention hereinafter, as one example, the uses in the three radio communication systems including: GSM900 suitable for the "Translation Loop"; W-CDMA suitable for the "Super-Heterodyne"; and PDC (800 MHz) suitable for the "Direct-Conversion" will be described.

The operation of the seventh embodiment is different from the operation of the first embodiment only in the operation using the "Super-Heterodyne" and "Direct-Conversion", and therefore only this different respect will be described here. For the other operations, the first embodiment is referred to, and the description thereof is omitted.

Additionally, to concretely describe the operation of the seventh embodiment of the present invention, the frequency configuration shown in the following Table 7 is used.

TABLE 7

Concrete Frequency Configuration (7) of Radio Communication System

| Radio communication system name | Signal band width | IF signal frequency | RF output signal frequency |
|---|---|---|---|
| GSM900 | 200 kHz | 95 MHz | 880 to 915 MHz |
| W-CDMA | 3.84 MHz | 380 MHz | 1920 to 1980 MHz |
| PDC (800 MHz band) | 25 kHz | — | 887 to 958 MHz |

(Use in W-CDWA)

The digital signal processor 100 inputs the base band signals of W-CDMA of the I and Q channels, deviating in phase from each other by 90 degrees, into the quadrature modulator 4, frequency-converts to the IF signal with a frequency of 380 MHz, and inputs into the first quadrature modulator output signal segmenting means 17, similarly as the first embodiment of the present invention. Subsequently, the IF signal of W-CDMA outputted from the first quadrature modulator output signal segmenting means 17 is inputted into the variable gain amplifier for IF and RF 36.

The variable gain amplifier for IF and RF 36 amplifies the inputted IF signal of W-CDMA, and outputs the signal to the IF and RF band variable band pass filter 37. In this case, the variable gain amplifier for IF and RF 36 concretely has a property of being capable of amplifying the signal having a frequency of 380 MHz and a band width of 3.84 MHz.

After the unnecessary signals are removed from the IF signals of W-CDMA inputted into the IF and RF band variable band pass filter 37, the IF signals are outputted to the IF and RF band variable band pass filter output signal segmenting means 38. In this case, the IF and RF band variable band pass filter 37 is set to the central frequency of 380 MHz and the pass band width of 3.84 MHz.

When the inputted signal is the IF signal of W-CDMA, the IF and RF band variable band pass filter output signal segmenting means 38 operates to input the signal to the frequency converter 8.

Here, as the IF and RF band variable band pass filter output signal segmenting means 38, concretely the switch for switching the signal path, the diplexer for segmenting the pass path by the frequency, and the like are used.

In the frequency converter 8, the IF signals of W-CDMA outputted from the IF and RF band variable band pass filter output signal segmenting means 38 and the second LO signal of W-CDMA outputted from the second synthesizer 9 are inputted.

Here, the frequency of the second LO signal is higher or lower than that of the RF output signal of W-CDMA of 1920 to 1980 MHz by 380 MHz, that is, in a range of 2300 to 2360 MHz or 1540 to 1600 MHz. In this case, any one of high and low frequencies may be used as the frequency of the second LO signal of W-CDMA.

The frequency converter 8 multiplies two signals so that the frequency of the frequency-converted output signal is in a range of 1920 to 1980 MHz.

Subsequently, the output signal frequency-converted in the frequency converter 8 is outputted from the "super-Heterodyne" signal output terminal 13.

(Use in PDC (800 MHz))

The base band signals of PDC (800 MHz) of the I and Q channels, deviating in phase from each other by 90 degrees, from the digital signal processor 100 are frequency-converted to the RF signals with a frequency of 887 to 958 MHz similarly as the first embodiment of the present invention.

The RF signal of PDC (800 MHz) outputted from the quadrature modulator is are passed through the first quadrature modulator output signal segmenting means 17, and inputted into the variable gain amplifier for IF and RF 36.

The variable gain amplifier for IF and RF 36 amplifies the inputted RF signal of PDC (800 MHz), and outputs the signal to the IF and RF band variable band pass filter 37.

In this case, the variable gain amplifier for IF and RF 36 concretely has a property of being capable of amplifying the RF signal having a frequency of 380 MHz and band width of 25 kHz.

The RF signal of PDC (800 MHz) outputted from the IF and RF band variable band pass filter 37 is outputted from the first signal output terminal for the "Direct-Conversion" 16. In this case, for the IF and RF band variable band pass filter 37, the central frequency is set to a range of 887 to 958 MHz, and the pass band width is set to 3.84 MHz.

As described above, in the seventh embodiment, the quadrature modulator and frequency converter heretofore disposed separately for GS, W-CDMA, PHS and PDC (800 MHz) are used in common. Moreover, for the IF and RF variable gain amplifier and band pass filter heretofore disposed separately for W-CDMA and PDC (800 MHz), the variable gain amplifier 36 and band pass filter 37 which can be used in common in W-CDMA and PDC (800 MHz) are disposed. Thereby, the number of constituting elements is decreased. The transmitter can operate as the "Translation Loop", "Super-Heterodyne", or "Direct-Conversion". When this transmitter is used, the small-sized and lightweight transmitter of the "multimode radio apparatus" can be realized.

Additionally, here, the uses of GSM900 as the radio communication system suitable for the "Translation Loop", W-CDMA as the radio communication system suitable for the "Super-Heterodyne", and PDC (800 MHz) as the radio communication systems suitable for the "Direct-Conversion" have been described. However, the combinations of the radio method and radio communication system other than the above-described combinations may also be used.

(Eighth Embodiment)

According to an eighth embodiment, there is provided a transmitter composed of combining "Translation Loop", "Super-Heterodyne" and "Direct-Conversion" which can be used in the three radio communication systems including: GSM900 using the GMSK modulation; W-CDMA using the HPSK modulation; and PDC (800 MHz band) using the π/4-QPSK modulation, and the transmitter uses the variable gain amplifier and band pass filter which operate at IF and RF, and a frequency converter having a function of passing a signal without performing frequency conversion.

Figure 12:
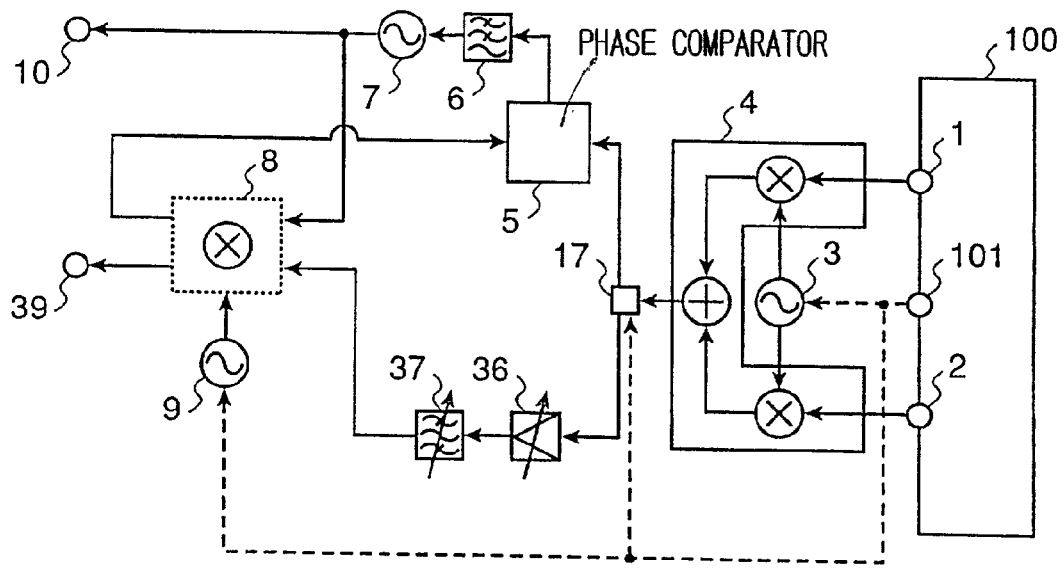
FIG. 12 is a block diagram of a transmitter composed of combining "Translation Loop", "Super-Heterodyne", and "Direct-Conversion" which can be used in three radio communication systems including: GSM900 using the GMSK modulation; W-CDMA using the HPSK modulation; and PDC (800 MHz band) using the π/4-QPSK modulation according to an eighth embodiment of the present invention, and the transmitter uses the variable gain amplifier and band pass filter which operate at IF and RF, and a frequency converter having a function of passing a signal without frequency conversion.
Figure 13:
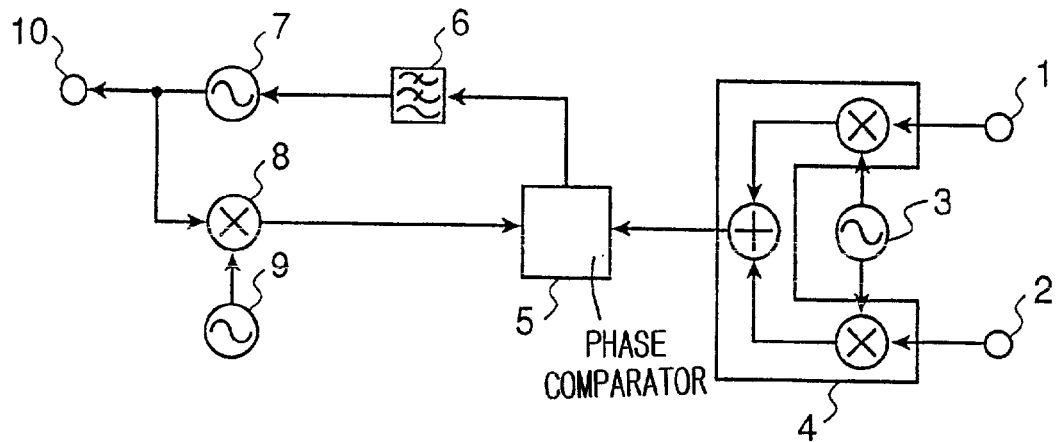
FIG. 13 is a block diagram of a transmitter called the "Translation Loop" which has heretofore been used in a transmission section of a radio apparatus for a radio communication system using a frequency modulation.
Figure 14:
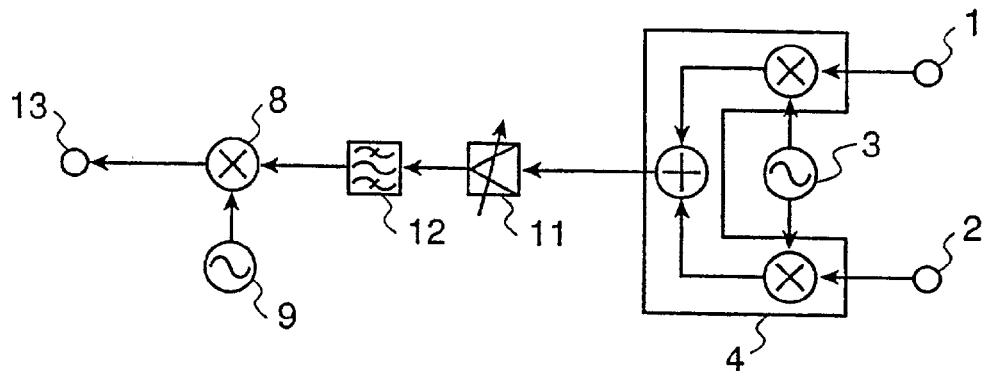
FIG. 14 is a block diagram of a transmitter called "Super-Heterodyne system" which has heretofore been used in the transmission section of the radio apparatus for the radio communication system.
Figure 15:
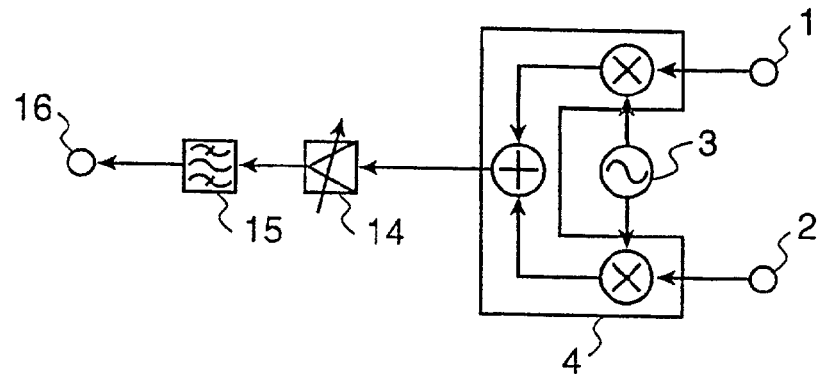
FIG. 15 is a block diagram of a transmitter called "Direct-Conversion system" which has heretofore been used in the transmission section of the radio apparatus for the radio communication system.

FIG. 12 is a block diagram of the multimode radio transmitter according to the eighth embodiment of the present invention, and shows a modification example of the first embodiment.

That is, the IF and RF variable gain amplifiers and band pass filters for use in the "Super-Heterodyne" and "Direct-Conversion" are changed to the variable gain amplifier which can be used both in IF and RF, and band pass filter which can be used both in IF and RF and can freely change the properties such as the central frequency and pass band width in a specific range. Moreover, a certain special frequency converter is used which has a function of outputting the inputted signal as such without converting the frequency in addition to the function of the frequency converter.

As a characteristic of the eighth embodiment, as the band pass filter for IF and RF for use in the seventh embodiment, the filter is used which can be used in the IF to RF frequency band and whose central frequency and pass band width can freely be changed in the certain limited frequency range. Moreover, the frequency converter is used which has the function of outputting the inputted signal as such without converting the frequency in addition to the function of the frequency converter for converting the frequency.

Examples of the control method concerning the operation of the filter and frequency converter include: a method of setting the operation so that the control signal is supplied from the base band signal processor (not shown) and the desired pass band property is imparted; a method of controlling the LO signal inputted into the frequency converter with an ON/OFF switch; and the like. However, the present invention does not depend on these control methods, and other control methods may be used.

In FIG. 12, since the components 1 to 38 are similar to those of FIG. 11, FIG. 11 is referred to, and the description thereof is omitted here. A reference numeral 39 denotes a "Super-Heterodyne" and "Direct-Conversion" signal output terminal.

Here, in the frequency converter 8 for use in the eighth embodiment of the present invention, the above-described frequency converter can be used which has the function of being capable of outputting the inputted signal as such without converting the frequency in addition to the function of converting the frequency.

To concretely describe the operation of the eighth embodiment of the present invention hereinafter, as one example, the uses in the three radio communication systems including: GSM900 suitable for the "Translation Loop"; W-CDMA suitable for the "Super-Heterodyne"; and PDC (800 MHz) suitable for the "Direct-Conversion" will be described.

The operation of the eighth embodiment is different from the operation of the first embodiment only in the operation using the "Super-Heterodyne" and "Direct-Conversion", and therefore only this different respect will be described here. For the other operations, the first embodiment is referred to, and the description thereof is omitted.

To concretely describe the operation of the present transmission section, the frequency configuration shown in the following Table 8 is used.

TABLE 8

Concrete Frequency Configuration (8) of Radio Communication System

| Radio communication system name | Signal band width | IF signal frequency | RF output signal frequency |
|---|---|---|---|
| GSM900 | 200 kHz | 95 MHz | 880 to 915 MHz |
| W-CDMA | 3.84 MHz | 380 MHz | 1920 to 1980 MHz |
| PDC (800 MHz band) | 25 kHz | — | 887 to 958 MHz |

The base band signals of W-CDMA and PDC (800 MHz) of the I and Q channels, deviating in phase from each other by 90 degrees, from the digital signal processor 100 are frequency-converted in the quadrature modulator 4, and outputted from the IF and RF band variable band pass filter 37, similarly as the seventh embodiment of the present invention.

(Use in W-CDMA)

the IF signals of W-CDMA outputted from the IF and RF band variable band pass filter 37 and having the unnecessary signals removed therefrom are outputted to the frequency converter 8.

The frequency converter 8 operates as the frequency converter for multiplying the IF signal of the W-CDMA outputted from the IF and RF band variable band pass filter 37 by the second LO signal of W-CDMA outputted from the second synthesizer 9, and converting to the frequency of the RF signal of the W-CDMA, when the inputted signal is the IF signal of W-CDMA.

Concretely, the IF signal of W-CDMA with a frequency of 380 MHz is multiplied by the second LO signal outputted from the second synthesizer 9 and having a frequency higher or lower than that of the RF output signal of W-CDMA of 1920 to 1980 MHz by 380 MHz, that is, in a range of 2300 to 2360 MHz or 1540 to 1600 MHz. Then, the RF signal of W-CDMA having a frequency in a range of 1920 to 1980 MHz is outputted. In this case, any one of high and low frequencies may be used as the frequency of the second LO signal of W-CDMA.

Subsequently, the output signal frequency-converted in the frequency converter 8 is outputted from the "Super-Heterodyne" and "Direct-Conversion" signal output terminal 39.

(Use in PDC (800 MHz))

The RF signals of PDC (800 MHz) outputted from the IF and RF band variable band pass filter 37 and having the unnecessary signals removed therefrom are outputted to the frequency converter 8.

When the inputted signal is the RF signal of PDC (800 MHz), the frequency converter 8 operates to output the inputted RF signal of PDC (800 MHz) as such to the "Super-Heterodyne" and "Direct-Conversion" signal output terminal 39 without performing the multiplication of the signals as the operation of the frequency converter.

As described above, in the eighth embodiment, the quadrature modulator and frequency converter heretofore disposed separately for GS, W-CDMA, PHS and PDC (800 MHz) are used in common. Moreover, for the IF and RF variable gain amplifier and band pass filter heretofore disposed separately for W-CDMA and PDC (800 MHz), the variable gain amplifier and band pass filter which can be used in common in W-CDMA and PDC (800 MHz) are used. Thereby, the number of composing elements is decreased. The transmitter can operate as the "Translation Loop", "Super-Heterodyne" or "Direct-Conversion". When this transmitter is used, the small-sized and lightweight transmitter of the "multimode radio apparatus" can be realized.

Additionally, here, the uses of GSM900 as the radio communication system suitable for the "Translation Loop", W-CDMA as the radio communication system suitable for the "Super-Heterodyne", and PDC (800 MHz) as the radio communication systems suitable for the "Direct-Conversion" have been described. However, the combinations of the radio method and radio communication system other than the above-described combinations may also be used.

As described above, needless to say, it is possible to appropriately combine and use the scope of the first to eighth embodiments of the present invention.

What is claimed is:

1. A radio transmitter comprising:

a digital signal processing section which outputs a base band signal for a first or second radio communication system;

a frequency synthesizer which outputs a local oscillator signal for said first or second radio communication system;

a quadrature modulator which generates a modulated signal based on said base band signal and said local oscillator signal;

a first output terminal which outputs a transmission signal for said first radio communication system;

a second output terminal which outputs a transmission signal for said second radio communication system;

a first transmission processing section which is disposed between said quadrature modulator and said first output terminal, corresponds to said first radio communication system, and conducts a frequency conversion of said modulated signal to apply the frequency-converted signal to said first output terminal;

a second transmission processing section which is disposed between said quadrature modulator and said second output terminal, corresponds to said second radio communication system, and applies said modulated signal to said second output terminal without conducting the frequency conversion; and a first switch section which changes whether or not to supply an output signal of said quadrature modulator to said first or second transmission processing section.

2. The radio transmitter according to claim 1 wherein said first transmission processing section includes:

a first variable gain amplifier to adjust a level of said quadrature modulation signal which is passed through said first switch section and corresponds to said first radio communication system;

a first filter section which removes an unnecessary frequency signal included in an output of said first variable gain amplifier; and a frequency converter which converts a frequency of an output signal of said first filter section and supplies the signal to said first output terminal, wherein said second transmission processing section includes:

a second variable gain amplifier to adjust the power of said quadrature modulation signal which is passed through said first switch section and corresponds to said second radio communication system; and a second filter section which attenuates an unnecessary frequency signal included in an output of said second variable gain amplifier and supplies the signal to said second output terminal.

3. A radio transmitter comprising:

a digital signal processing section which can output a base band signal for a first or second radio communication system;

a first frequency synthesizer which can output a first local oscillator signal for said first radio communication system, or a second local oscillator signal for said second radio communication system;

a quadrature modulator which can generate a quadrature modulation signal based on said base band signal and said first local oscillator signal, or a quadrature modulation signal based on said base band signal and said second local oscillator signal;

a first output terminal which outputs a transmission signal for said first radio communication system;

a second output terminal which outputs a transmission signal for said second radio communication system;

a first transmission processing section which is disposed between said quadrature modulator and said first output terminal and converts a frequency of a signal relating to said quadrature modulation signal for said first radio communication system in a frequency converter;

a second transmission processing section which is disposed between said quadrature modulator and said second output terminal and converts a frequency of said quadrature modulation signal for said second radio communication system in said frequency converter;

a second frequency synthesizer which supplies a third local oscillator signal for said first radio communication system or a fourth local oscillator signal for said second radio communication system to said frequency converter; and a first switch section which changes whether or not to supply an output signal of said quadrature modulator to said first or second transmission processing section, wherein said first transmission processing section includes:

a phase comparator configured to compare a phase of said quadrature modulation signal which is passed through said first switch section and corresponds to said first radio communication system with a phase of an output signal of said frequency converter;

a first filter section which removes an unnecessary frequency signal included in an output signal of said phase comparator; and a voltage control oscillator which generates an oscillator signal in accordance with an output voltage of said first filter section and supplies the oscillator signal to said first output terminal and said frequency converter, wherein said second transmission processing section includes:

a variable gain amplifier to adjust a gain of said quadrature modulation signal which is passed through said first switch section and corresponds to said second radio communication system; and a second filter section which removes an unnecessary frequency signal included in an output of said variable gain amplifier.

4. The radio transmitter according to claim 3 wherein said voltage control oscillator in said first transmission processing section generates a first or second oscillator signal different in frequency from each other and supplies the signal to said first output terminal and said frequency converter based on said base band signal.

5. The radio transmitter according to claim 4 wherein said voltage control oscillator is a dual mode oscillator.

6. The radio transmitter according to claim 3 wherein said second filter section in said second transmission processing section includes:

a first band limit section which passes a signal of a first frequency band in the output signal of said variable gain amplifier and supplies the signal to said frequency converter; and a second band limit section which passes a signal of a second frequency band in the output signal of said variable gain amplifier and supplies the signal to said frequency converter.

7. The radio transmitter according to claim 6 wherein said variable gain amplifier in said second transmission processing section includes first and second gain variable amplification sections which can arbitrarily adjust levels of signals of frequency bands different from each other, an output of said first gain variable amplification section is supplied to said first band limit section, and an output of said second gain variable amplification section is supplied to said second band limit section.

8. The radio transmitter according to claim 6, further comprising: a second switch section which changes whether or not to supply an output of said variable gain amplifier in said second transmission processing section to said first or second band limit section.

9. The radio transmitter according to claim 8 wherein said variable gain amplifier in said third transmission processing section includes first and second gain variable amplification sections which can arbitrarily adjust gains of signals of frequency bands different from each other, an output of said first gain variable amplification section is supplied to said first band limit section, and an output of said second gain variable amplification section is supplied to said second band limit section.

10. The radio transmitter according to claim 9, further comprising: a second switch section which changes whether or not to supply an output of said variable gain amplifier in said second transmission processing section to said first or second band limit section.

11. The radio transmitter according to claim 3 wherein said variable gain amplifier in said second transmission processing section can arbitrarily adjust the gain in a predetermined frequency range, and said second filter section in said second transmission processing section can arbitrarily change a central frequency and pass band width in the predetermined frequency range.

12. A radio transmitter comprising:
a digital signal processing section which can output a base band signal for a first or second radio communication system;
a first frequency synthesizer which can output a first local oscillator signal for said first radio communication system, or a second local oscillator signal for said second radio communication system;
a quadrature modulator which can generate a quadrature modulation signal based on said base band signal and said first local oscillator signal, or a quadrature modulation signal based on said base band signal and said second local oscillator signal;
a first output terminal which outputs a transmission signal for said first radio communication system;
a second output terminal which outputs a transmission signal for said second radio communication system;
a first transmission processing section which is disposed between said quadrature modulator and said first output terminal and converts a frequency of a signal relating to said quadrature modulation signal for said first radio communication system in a frequency converter;
a second transmission processing section which is disposed between said quadrature modulator and said second output terminal and converts a frequency of said quadrature modulation signal for said second radio communication system in said frequency converter;
a second frequency synthesizer which supplies a third local oscillator signal for said first radio communication system or a fourth local oscillator signal for said second radio communication system to said frequency converter;
a first switch section which changes whether or not to supply an output signal of said quadrature modulator to said first or second transmission processing section;
a third output terminal which outputs a transmission signal for a third radio communication system; and
a third transmission processing section which is disposed between said quadrature modulator and said third output terminal and corresponds to said third radio communication system,
wherein said digital signal processing section can output the base band signal for said third radio communication system,
said first frequency synthesizer can output the third local oscillator signal for said third radio communication system,
said quadrature modulator can generate the quadrature modulation signal based on said base band signal and said third local oscillator signal, and
said first switch section can supply an output signal of said quadrature modulator to said first, second or third transmission processing section.

13. The radio transmitter according to claim 12 wherein said third transmission processing section includes:
a variable gain amplifier to adjust a level of said quadrature modulation signal which is passed through said first switch section and corresponds to said third radio communication system; and
a filter section which removes an unnecessary frequency signal included in an output of said variable gain amplifier.

14. The radio transmitter according to claim 13 wherein said filter section in said third transmission processing section includes:
a first band limit section which passes a signal of a first frequency band in an output signal of said variable gain amplifier and supplies the signal to said third output terminal; and
a second band limit section which passes a signal of a second frequency band in the output signal of said variable gain amplifier and supplies the signal to said third output terminal.

15. The radio transmitter according to claim 12 wherein each of said second and third transmission processing sections includes:
a variable gain amplifier which adjusts the power of said quadrature modulation signal; and
a filter section which removes an unnecessary frequency signal included in an output of said variable gain amplifier,
wherein said variable gain amplifier can arbitrarily adjust the gain in a predetermined frequency range, and
said filter section can arbitrarily change a center frequency and pass band width in the predetermined frequency range.

16. A radio transmitter comprising:
a digital signal processing section which can output a base band signal for a first, second or third radio communication system;
a first frequency synthesizer which can output a first local oscillator signal for said first radio communication system, a second local oscillator signal for said second radio communication system or a third local oscillator signal for said third radio communication system;
a quadrature modulator which can generate a quadrature modulation signal based on said base band signal and said first local oscillator signal, a quadrature modulation signal based on said base band signal and said second local oscillator signal, or a quadrature modulation signal based on said base band signal and said third local oscillator signal;
a first output terminal which outputs a transmission signal for said first radio communication system;
a second output terminal which outputs a transmission signal for said second radio communication system;
a third output terminal which outputs a transmission signal for said third radio communication system;
a first transmission processing section which is disposed between said quadrature modulator and said first output terminal and converts a frequency of a signal relating to said quadrature modulation signal for said first radio communication system in a frequency converter;
a second transmission processing section which is disposed between said quadrature modulator and said second and third output terminals, converts a frequency of said quadrature modulation signal for said second radio communication system in said frequency converter, and processes said quadrature modulation signal for said third radio communication system;
a second frequency synthesizer which supplies the third local oscillator signal for said first radio communication system and a fourth local oscillator signal for said second radio communication system to said frequency converter; and
a first switch section which changes whether or not to supply said quadrature modulation signal to said first or second transmission processing section.

17. The radio transmitter according to claim 16 wherein said second transmission processing section includes:
   a variable gain amplifier to adjust a gain of said quadrature modulation signal which is passed through said first switch section and corresponds to said second and third radio communication systems;
   a filter section which removes an unnecessary frequency signal included in an output of said variable gain amplifier; and
   a second switch section which changes whether or not to supply an output of said filter section to said frequency converter and said third output terminal.

18. A radio transmission method comprising:
   outputting a base band signal for a first or second radio communication system;
   outputting a local oscillator signal for said first or second radio communication system;
   generating a quadrature modulation signal based on said base band signal and said local oscillator signal;
   switching the processing of said first radio communication system, or the processing of said second radio communication system with respect to said quadrature modulation signal;
   outputting said the first transmission processed signal from a first output terminal; and
   outputting the signal subjected to said second transmission processing from a second output terminal,
   wherein the processing of said first radio communication system conducts a frequency conversion of said quadrature modulation signal to apply the frequency-converted signal to said first output terminal; and
   the processing of said second radio communication system applies said quadrature modulation signal to said second output terminal without conducting the frequency conversion.

* * * * *